(12) United States Patent
Natanzon et al.

(10) Patent No.: US 10,776,211 B1
(45) Date of Patent: Sep. 15, 2020

(54) METHODS, SYSTEMS, AND APPARATUSES TO UPDATE POINT IN TIME JOURNAL USING MAP REDUCE TO CREATE A HIGHLY PARALLEL UPDATE

(71) Applicant: EMC IP Holding Company LLC, Hopkinton, MA (US)

(72) Inventors: Assaf Natanzon, Tel Aviv (IL); Amit Lieberman, Raanana (IL); Ron Bigman, Holon (IL); Jehuda Shemer, Kfar Saba (IL); Leehod Baruch, Rishon Leziyon (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 521 days.

(21) Appl. No.: 15/390,996

(22) Filed: Dec. 27, 2016

(51) Int. Cl.
  G06F 7/00 (2006.01)
  G06F 17/00 (2019.01)
  G06F 11/14 (2006.01)
  G06F 16/25 (2019.01)

(52) U.S. Cl.
  CPC ...... *G06F 11/1451* (2013.01); *G06F 11/1464* (2013.01); *G06F 16/258* (2019.01); *G06F 2201/80* (2013.01); *G06F 2201/84* (2013.01)

(58) Field of Classification Search
  CPC .............. G06F 2201/84; G06F 11/1469; G06F 2201/855; G06F 11/2071; G06F 3/0619
  See application file for complete search history.

(56) References Cited

U.S. PATENT DOCUMENTS

| | | |
|---|---|---|
| 7,203,741 B2 | 4/2007 | Marco et al. |
| 7,516,287 B2 | 4/2009 | Ahal et al. |
| 7,650,331 B1 | 1/2010 | Dean et al. |
| 7,719,443 B1 | 5/2010 | Natanzon |
| 7,840,536 B1 | 11/2010 | Ahal et al. |
| 7,840,662 B1 | 11/2010 | Natanzon |
| 7,844,856 B1 | 11/2010 | Ahal et al. |
| 7,860,836 B1 | 12/2010 | Natanzon et al. |
| 7,882,286 B1 | 2/2011 | Natanzon et al. |

(Continued)

OTHER PUBLICATIONS

Notice of Allowance dated Jul. 19, 2018 for U.S. Appl. No. 15/390,999; 8 pages.

(Continued)

*Primary Examiner* — Tuan A Pham
(74) *Attorney, Agent, or Firm* — Daly Crowley Mofford & Durkee, LLP

(57) ABSTRACT

A storage system comprises an object store, which comprises a plurality of metadata objects, a plurality of change objects, and a plurality of data objects associated with data stored in at least one logical unit of a production site, and a replication site configured to generate a requested point in time (PIT) based at least in part on the plurality of data objects, by: dividing the plurality of metadata objects into a plurality of respective portions of metadata objects; mapping each respective portion of metadata objects to a respective one of a plurality of reducer nodes; performing map reduce operations on the respective portion of metadata objects, at each respective one of the plurality of reducer nodes, to apply the most recent list of changes that occurred to each offset before the first requested PIT; and merging together the list of changes from each reducer node into the requested PIT.

16 Claims, 13 Drawing Sheets

(56) References Cited

U.S. PATENT DOCUMENTS

| | | |
|---|---|---|
| 7,934,262 B1 | 4/2011 | Natanzon et al. |
| 7,958,372 B1 | 6/2011 | Natanzon |
| 8,037,162 B2 | 10/2011 | Marco et al. |
| 8,041,940 B1 | 10/2011 | Natanzon et al. |
| 8,060,713 B1 | 11/2011 | Natanzon |
| 8,060,714 B1 | 11/2011 | Natanzon |
| 8,103,937 B1 | 1/2012 | Natanzon et al. |
| 8,108,634 B1 * | 1/2012 | Natanzon ............ G06F 11/1662 707/610 |
| 8,214,612 B1 | 7/2012 | Natanzon |
| 8,232,687 B2 | 7/2012 | Stadler et al. |
| 8,250,149 B2 | 8/2012 | Marco et al. |
| 8,271,441 B1 | 9/2012 | Natanzon et al. |
| 8,271,447 B1 | 9/2012 | Natanzon et al. |
| 8,332,687 B1 | 12/2012 | Natanzon et al. |
| 8,335,761 B1 | 12/2012 | Natanzon |
| 8,335,771 B1 | 12/2012 | Natanzon et al. |
| 8,341,115 B1 | 12/2012 | Natanzon et al. |
| 8,370,648 B1 | 2/2013 | Natanzon |
| 8,380,885 B1 | 2/2013 | Natanzon |
| 8,392,680 B1 | 3/2013 | Natanzon et al. |
| 8,429,362 B1 | 4/2013 | Natanzon et al. |
| 8,433,869 B1 | 4/2013 | Natanzon et al. |
| 8,438,135 B1 | 5/2013 | Natanzon et al. |
| 8,464,101 B1 | 6/2013 | Natanzon et al. |
| 8,478,955 B1 | 7/2013 | Natanzon et al. |
| 8,495,304 B1 | 7/2013 | Natanzon et al. |
| 8,510,279 B1 | 8/2013 | Natanzon et al. |
| 8,521,691 B1 | 8/2013 | Natanzon |
| 8,521,694 B1 | 8/2013 | Natanzon |
| 8,543,609 B1 | 9/2013 | Natanzon |
| 8,583,885 B1 | 11/2013 | Natanzon |
| 8,600,945 B1 * | 12/2013 | Natanzon ................ G06F 11/20 707/648 |
| 8,601,085 B1 | 12/2013 | Ives et al. |
| 8,627,012 B1 | 1/2014 | Derbeko et al. |
| 8,683,592 B1 | 3/2014 | Dotan et al. |
| 8,694,700 B1 | 4/2014 | Natanzon et al. |
| 8,706,700 B1 | 4/2014 | Natanzon et al. |
| 8,712,962 B1 | 4/2014 | Natanzon et al. |
| 8,719,497 B1 | 5/2014 | Don et al. |
| 8,725,691 B1 | 5/2014 | Natanzon |
| 8,725,692 B1 | 5/2014 | Natanzon et al. |
| 8,726,066 B1 | 5/2014 | Natanzon et al. |
| 8,738,813 B1 | 5/2014 | Natanzon et al. |
| 8,745,004 B1 | 6/2014 | Natanzon et al. |
| 8,751,828 B1 | 6/2014 | Raizen et al. |
| 8,769,336 B1 | 7/2014 | Natanzon et al. |
| 8,805,786 B1 | 8/2014 | Natanzon |
| 8,806,161 B1 | 8/2014 | Natanzon |
| 8,825,848 B1 | 9/2014 | Dotan et al. |
| 8,832,399 B1 | 9/2014 | Natanzon et al. |
| 8,850,143 B1 | 9/2014 | Natanzon |
| 8,850,144 B1 | 9/2014 | Natanzon et al. |
| 8,862,546 B1 | 10/2014 | Natanzon et al. |
| 8,892,835 B1 | 11/2014 | Natanzon et al. |
| 8,898,112 B1 | 11/2014 | Natanzon et al. |
| 8,898,409 B1 | 11/2014 | Natanzon et al. |
| 8,898,515 B1 | 11/2014 | Natanzon |
| 8,898,519 B1 | 11/2014 | Natanzon et al. |
| 8,914,595 B1 | 12/2014 | Natanzon |
| 8,924,668 B1 | 12/2014 | Natanzon |
| 8,930,500 B2 | 1/2015 | Marco et al. |
| 8,930,947 B1 | 1/2015 | Derbeko et al. |
| 8,935,498 B1 | 1/2015 | Natanzon |
| 8,949,180 B1 | 2/2015 | Natanzon et al. |
| 8,954,673 B1 | 2/2015 | Natanzon et al. |
| 8,954,796 B1 | 2/2015 | Cohen et al. |
| 8,959,054 B1 | 2/2015 | Natanzon |
| 8,977,593 B1 | 3/2015 | Natanzon et al. |
| 8,977,826 B1 | 3/2015 | Meiri et al. |
| 8,995,460 B1 | 3/2015 | Ashraf et al. |
| 8,996,460 B1 * | 3/2015 | Frank ....................... G06F 11/14 707/624 |
| 8,996,461 B1 | 3/2015 | Natanzon et al. |
| 8,996,827 B1 | 3/2015 | Natanzon |
| 9,003,138 B1 | 4/2015 | Natanzon et al. |
| 9,026,696 B1 | 5/2015 | Natanzon et al. |
| 9,031,913 B1 | 5/2015 | Natanzon |
| 9,032,160 B1 | 5/2015 | Natanzon et al. |
| 9,037,818 B1 | 5/2015 | Natanzon et al. |
| 9,063,994 B1 * | 6/2015 | Natanzon ............ G06F 17/30575 |
| 9,069,479 B1 | 6/2015 | Natanzon |
| 9,069,709 B1 | 6/2015 | Natanzon et al. |
| 9,081,754 B1 | 7/2015 | Natanzon et al. |
| 9,081,842 B1 | 7/2015 | Natanzon et al. |
| 9,087,008 B1 | 7/2015 | Natanzon |
| 9,087,112 B1 | 7/2015 | Natanzon et al. |
| 9,104,529 B1 | 8/2015 | Derbeko et al. |
| 9,110,914 B1 | 8/2015 | Frank et al. |
| 9,116,811 B1 | 8/2015 | Derbeko et al. |
| 9,128,628 B1 | 9/2015 | Natanzon et al. |
| 9,128,855 B1 | 9/2015 | Natanzon et al. |
| 9,134,914 B1 | 9/2015 | Derbeko et al. |
| 9,135,119 B1 | 9/2015 | Natanzon et al. |
| 9,135,120 B1 | 9/2015 | Natanzon |
| 9,146,878 B1 | 9/2015 | Cohen et al. |
| 9,152,339 B1 | 10/2015 | Cohen et al. |
| 9,152,578 B1 | 10/2015 | Saad et al. |
| 9,152,814 B1 | 10/2015 | Natanzon |
| 9,158,578 B1 | 10/2015 | Derbeko et al. |
| 9,158,630 B1 | 10/2015 | Natanzon |
| 9,160,526 B1 | 10/2015 | Raizen et al. |
| 9,177,670 B1 | 11/2015 | Derbeko et al. |
| 9,189,339 B1 | 11/2015 | Cohen et al. |
| 9,189,341 B1 | 11/2015 | Natanzon et al. |
| 9,201,736 B1 | 12/2015 | Moore et al. |
| 9,223,659 B1 | 12/2015 | Natanzon et al. |
| 9,225,529 B1 | 12/2015 | Natanzon et al. |
| 9,235,481 B1 | 1/2016 | Natanzon et al. |
| 9,235,524 B1 | 1/2016 | Derbeko et al. |
| 9,235,632 B1 | 1/2016 | Natanzon |
| 9,244,997 B1 | 1/2016 | Natanzon et al. |
| 9,256,605 B1 | 2/2016 | Natanzon |
| 9,274,718 B1 | 3/2016 | Natanzon et al. |
| 9,275,063 B1 | 3/2016 | Natanzon |
| 9,286,052 B1 | 3/2016 | Solan et al. |
| 9,305,009 B1 | 4/2016 | Bono et al. |
| 9,323,750 B2 | 4/2016 | Natanzon et al. |
| 9,330,155 B1 | 5/2016 | Bono et al. |
| 9,336,094 B1 | 5/2016 | Wolfson et al. |
| 9,336,230 B1 | 5/2016 | Natanzon |
| 9,367,260 B1 | 6/2016 | Natanzon |
| 9,378,096 B1 | 6/2016 | Erel et al. |
| 9,378,219 B1 | 6/2016 | Bono et al. |
| 9,378,261 B1 | 6/2016 | Bono et al. |
| 9,383,937 B1 | 7/2016 | Frank et al. |
| 9,389,800 B1 | 7/2016 | Natanzon et al. |
| 9,405,481 B1 | 8/2016 | Cohen et al. |
| 9,405,684 B1 | 8/2016 | Derbeko et al. |
| 9,405,765 B1 | 8/2016 | Natanzon |
| 9,411,535 B1 | 8/2016 | Shemer et al. |
| 9,459,804 B1 | 10/2016 | Natanzon et al. |
| 9,460,028 B1 | 10/2016 | Raizen et al. |
| 9,471,579 B1 | 10/2016 | Natanzon |
| 9,477,407 B1 | 10/2016 | Marshak et al. |
| 9,501,542 B1 | 11/2016 | Natanzon |
| 9,507,732 B1 | 11/2016 | Natanzon et al. |
| 9,507,845 B1 | 11/2016 | Natanzon et al. |
| 9,514,138 B1 | 12/2016 | Natanzon et al. |
| 9,524,218 B1 | 12/2016 | Veprinsky et al. |
| 9,529,885 B1 | 12/2016 | Natanzon et al. |
| 9,535,800 B1 | 1/2017 | Natanzon et al. |
| 9,535,801 B1 | 1/2017 | Natanzon et al. |
| 9,547,459 B1 | 1/2017 | BenHanokh et al. |
| 9,547,591 B1 | 1/2017 | Natanzon et al. |
| 9,552,405 B1 | 1/2017 | Moore et al. |
| 9,557,921 B1 | 1/2017 | Cohen et al. |
| 9,557,925 B1 | 1/2017 | Natanzon |
| 9,563,517 B1 | 2/2017 | Natanzon et al. |
| 9,563,684 B1 | 2/2017 | Natanzon et al. |
| 9,575,851 B1 | 2/2017 | Natanzon et al. |
| 9,575,857 B1 | 2/2017 | Natanzon |
| 9,575,894 B1 | 2/2017 | Natanzon et al. |

(56) References Cited

U.S. PATENT DOCUMENTS

| | | |
|---|---|---|
| 9,582,382 B1 | 2/2017 | Natanzon et al. |
| 9,588,703 B1 | 3/2017 | Natanzon et al. |
| 9,588,847 B1 | 3/2017 | Natanzon et al. |
| 9,594,822 B1 | 3/2017 | Natanzon et al. |
| 9,600,377 B1 | 3/2017 | Cohen et al. |
| 9,619,543 B1 | 4/2017 | Natanzon et al. |
| 9,632,881 B1 | 4/2017 | Natanzon |
| 9,665,305 B1 | 5/2017 | Natanzon et al. |
| 9,710,177 B1 | 7/2017 | Natanzon |
| 9,720,618 B1 | 8/2017 | Panidis et al. |
| 9,722,788 B1 | 8/2017 | Natanzon et al. |
| 9,727,429 B1 | 8/2017 | Moore et al. |
| 9,733,969 B2 | 8/2017 | Derbeko et al. |
| 9,737,111 B2 | 8/2017 | Lustik |
| 9,740,572 B1 | 8/2017 | Natanzon et al. |
| 9,740,573 B1 | 8/2017 | Natanzon |
| 9,740,880 B1 | 8/2017 | Natanzon et al. |
| 9,749,300 B1 | 8/2017 | Cale et al. |
| 9,772,789 B1 | 9/2017 | Natanzon et al. |
| 9,798,472 B1 | 10/2017 | Natanzon et al. |
| 9,798,490 B1 | 10/2017 | Natanzon |
| 9,804,934 B1 | 10/2017 | Natanzon et al. |
| 9,811,431 B1 | 11/2017 | Natanzon et al. |
| 9,823,865 B1 | 11/2017 | Natanzon et al. |
| 9,823,973 B1 | 11/2017 | Natanzon |
| 9,832,261 B2 | 11/2017 | Don et al. |
| 9,846,698 B1 | 12/2017 | Panidis et al. |
| 9,875,042 B1 | 1/2018 | Natanzon et al. |
| 9,875,162 B1 | 1/2018 | Panidis et al. |
| 9,880,777 B1 | 1/2018 | Bono et al. |
| 9,881,014 B1 | 1/2018 | Bono et al. |
| 9,910,620 B1 | 3/2018 | Veprinsky et al. |
| 9,910,621 B1 | 3/2018 | Golan et al. |
| 9,910,735 B1 | 3/2018 | Natanzon |
| 9,910,739 B1 | 3/2018 | Natanzon et al. |
| 9,917,854 B2 | 3/2018 | Natanzon et al. |
| 9,921,955 B1 | 3/2018 | Derbeko et al. |
| 9,933,957 B1 | 4/2018 | Cohen et al. |
| 9,934,302 B1 | 4/2018 | Cohen et al. |
| 9,940,205 B2 | 4/2018 | Natanzon |
| 9,940,460 B1 | 4/2018 | Derbeko et al. |
| 9,946,649 B1 | 4/2018 | Natanzon et al. |
| 9,959,061 B1 | 5/2018 | Natanzon et al. |
| 9,965,306 B1 | 5/2018 | Natanzon et al. |
| 9,990,256 B1 | 6/2018 | Natanzon |
| 9,996,539 B1 | 6/2018 | Natanzon |
| 10,007,626 B1 | 6/2018 | Saad et al. |
| 10,019,194 B1 | 7/2018 | Baruch et al. |
| 10,025,931 B1 | 7/2018 | Natanzon et al. |
| 10,031,675 B1 | 7/2018 | Veprinsky et al. |
| 10,031,690 B1 | 7/2018 | Panidis et al. |
| 10,031,692 B2 | 7/2018 | Elron et al. |
| 10,031,703 B1 | 7/2018 | Natanzon et al. |
| 10,037,251 B1 | 7/2018 | Bono et al. |
| 10,042,579 B1 | 8/2018 | Natanzon |
| 10,042,751 B1 | 8/2018 | Veprinsky et al. |
| 2008/0059541 A1 | 3/2008 | Fachan et al. |
| 2011/0313973 A1 | 12/2011 | Srivas et al. |
| 2013/0218840 A1* | 8/2013 | Smith .............. G06F 11/1446 707/639 |

OTHER PUBLICATIONS

U.S. Appl. No. 15/390,999, filed Dec. 27, 2016, Natanzon et al.
Natanzon et al., "Virtual Point in Time Access;" Proceedings of the 6th International Systems and Storage Conference; Jun. 30-Jul. 2, 2013; 8 Pages.
Rubens, "What are Containers and Why do You Need Them?;" CIO from IDG; May 20, 2015; 6 Pages.
"TechTarget's SearchServerVisualization.com Announces Call for Nominations of Best of VMworld 2015 Awards;" Jul. 2, 2015; 2 Pages.
Vaidya, "Survey of Parallel Data Processing in Context with MapReduce;" Department of Computer Science, Vivekanand College, Cehmbur, Mumbai; 2011; 12 Pages.

* cited by examiner

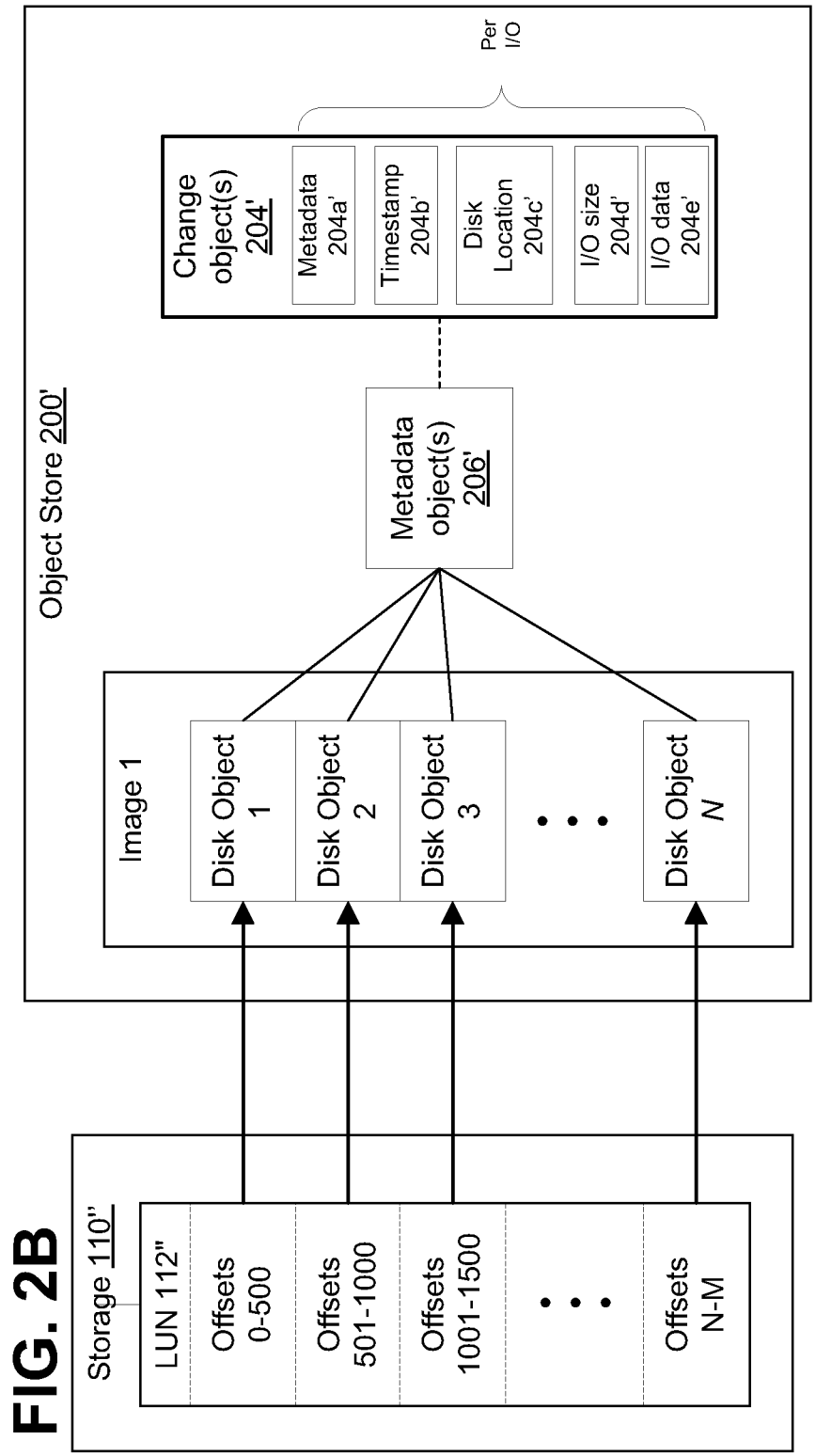

| Disk Object | Offset Range | Metadata Entries by time | Reducing VM Assigned | "Latest" entry for offset for PIT at Time = T3 |
|---|---|---|---|---|
| D1 | 0-500 | D1 (T0-T1); D1(T1-T2); D1 (T2-T3) | RVM_1 | D1 (T2-T3) |
| D2 | 501-1000 | D2(T0-T1); D2(T1-T2); D2 (T2-T3) | RVM_2 | D2 (T2-T3) |
| D3 | 1001-1500 | D3(T0-T1); D3 (T1-T2) | RVM_3 | D3 (T1-T2) |
| D4 | 1501-2000 | D4 (T0-T1); D4 | RVM_4 | T4 (T0-T1) |

METHODS, SYSTEMS, AND APPARATUSES TO UPDATE POINT IN TIME JOURNAL USING MAP REDUCE TO CREATE A HIGHLY PARALLEL UPDATE

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

This application relates at least to generally relate to devices, systems, and methods for data storage in computer systems. More particularly, this application relates at least to journal-based replication that makes use of a highly parallel process and a map reduce process.

BACKGROUND

Computer data is vital to today's organizations and a significant part of protection against disasters is focused on data protection. As solid-state memory has advanced to the point where cost of memory has become a relatively insignificant factor, organizations can afford to operate with systems that store and process terabytes of data. Conventional data protection system uses data replication, by creating a copy of the organization's production site data on a secondary backup storage system, and updating the backup with changes. The backup storage system may be situated in the same physical location as the production storage system, or in a physically remote location. Data replication systems generally operate either at the application level, at the file system level, or at the data block level.

One example of a data protection system is a distributed storage system. A distributed storage system may include a plurality of storage devices (e.g., storage arrays) to provide data storage to a plurality of nodes. The plurality of storage devices and the plurality of nodes may be situated in the same physical location, or in one or more physically remote locations. A distributed storage system may include data protection systems that back up production site data by replicating production site data on a secondary backup storage system. The production site data may be replicated on a periodic basis and/or may be replicated as changes are made to the production site data. Some existing data protection systems may provide continuous data protection, meaning that every change made to data is backed up. Current data protection systems try to provide continuous data protection, which enable the organization to roll back to any specified point in time within a recent history. Continuous data protection typically uses a technology referred to as "journaling," whereby a log is kept of changes made to the backup storage. During a recovery, the journal entries serve as successive "undo" information, enabling rollback of the backup storage to previous points in time.

SUMMARY

This Summary is provided to introduce a selection of concepts in a simplified form, to provide a basic understanding of one or more embodiments that are further described below in the Detailed Description. This Summary is not intended to identify key features or essential features of the claimed subject matter, nor is it intended to be used to limit the scope of the claimed subject matter.

One embodiment provides a storage system comprising a replication site and an object store. The replication site is configured to be in operable communication with a production site, and the object store is configured for the replication site, where the object store comprises a plurality of data objects associated with data stored in at least one logical unit (LU) of the production site, a plurality of metadata objects, and a plurality of change objects. The replication site is configured to generate a requested point in time (PIT) based at least in part on the plurality of data objects, the generation of the PIT comprising: dividing the plurality of metadata objects into a plurality of respective portions of metadata objects; mapping each respective portion of metadata objects, based on offset within the LU, to a respective one of a plurality of reducer nodes in operable communication with the storage system; performing map reduce operations on the respective portion of metadata objects, at each respective one of the plurality of reducer nodes, to apply the most recent list of changes that occurred to each offset before the first requested point in time; and merging together the list of changes from each reducer node into the requested PIT.

One embodiment provides a computer-implemented method. An object store is generated, the object store disposed at a replication site and comprising a plurality of data objects associated with data stored in at least one logical unit (LU) of a production site in operable communication with the replication site, a plurality of metadata objects, and a plurality of change objects. The replication site is configured to generate a requested point in time (PIT) based at least in part on the plurality of data objects. The plurality of metadata data objects are divided into a plurality of respective portions of data objects. Each respective portion of metadata objects is mapped, based on offset within the LU, to a respective one of a plurality of reducer nodes in operable communication with the storage system. Map reduce operations are performed on the respective portion of metadata, at each respective one of the plurality of reducer nodes, to apply the most recent list of changes that occurred to each offset before the first requested point in time. The list of changes from each respective reducer node are merged together into the requested PIT.

Details relating to this and other embodiments are described more fully herein.

BRIEF DESCRIPTION OF THE DRAWING FIGURES

Objects, aspects, features, and advantages of embodiments disclosed herein will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features. For clarity, not every element may be labeled in every figure. The drawings are not necessarily to scale, emphasis instead being placed upon illustrating embodiments, principles, and concepts. The drawings are not meant to limit the scope of the claims included herewith.

FIG. 2B is a block diagram showing an illustrative relationship between objects in the object store of FIG. 2A, in accordance with a second illustrative embodiment;\

Figure 4:
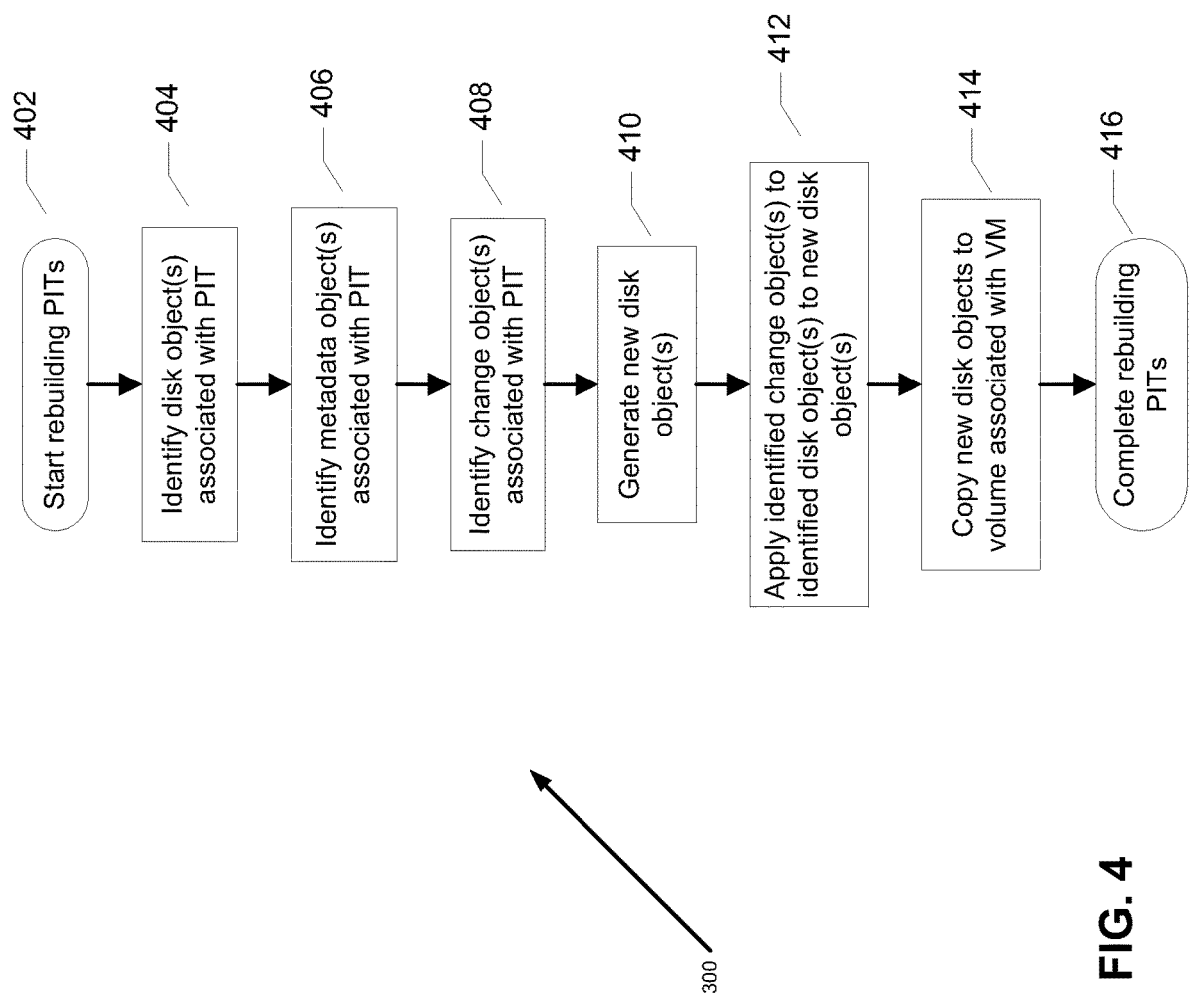
FIG. 4 is a first flowchart illustrating a first method of updating/rebuilding point in time (PIT) information, using the data protection system of FIGS. 1A-3, in accordance with at least one illustrative embodiment of the instant disclosure.
Figure 5A:
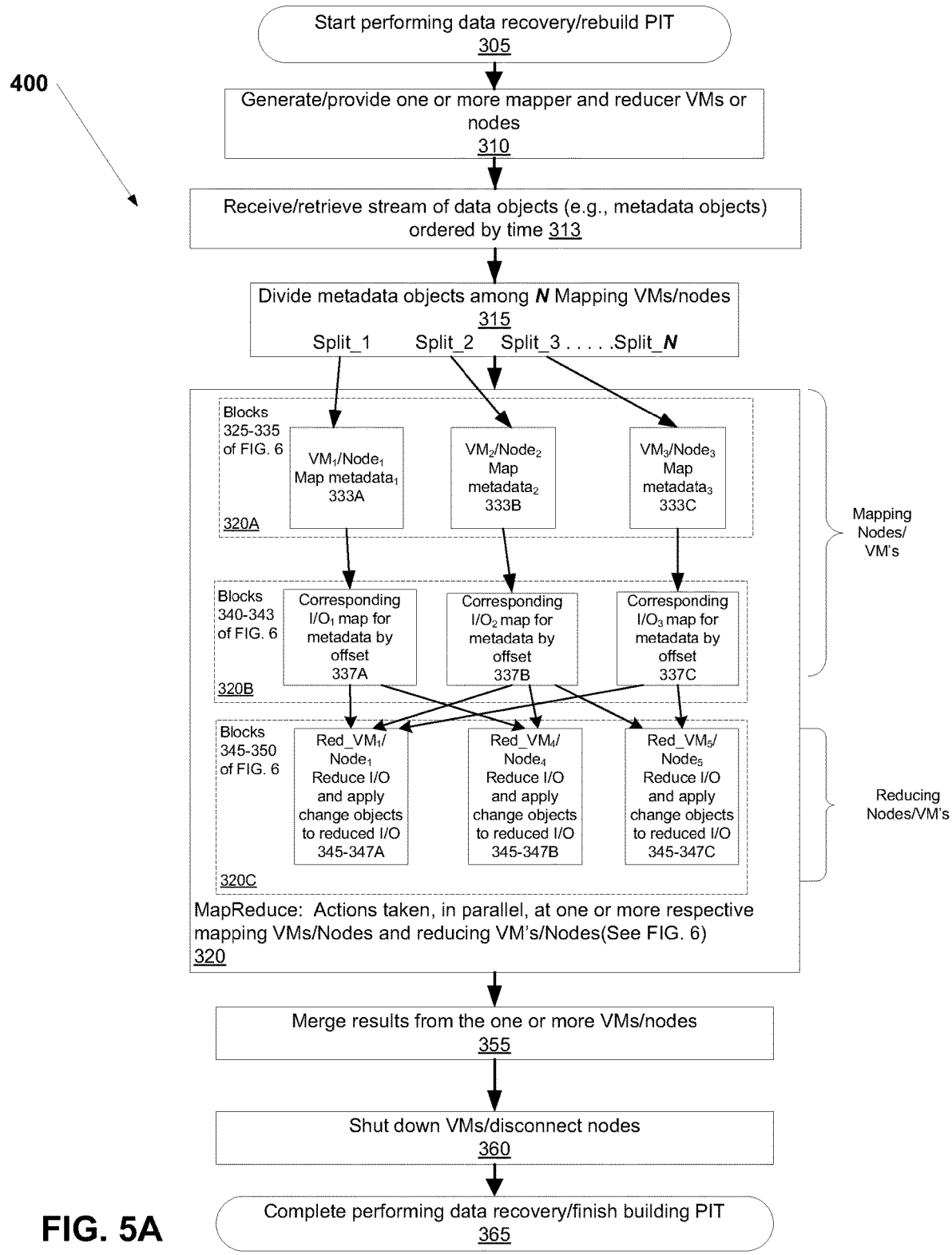
FIG. 5A is a second flowchart illustrating a second method of updating/rebuilding PIT information, using the data protection system of FIGS. 1A-3, in accordance with at least one illustrative embodiment of the instant disclosure.
Figures 5B, 5C:
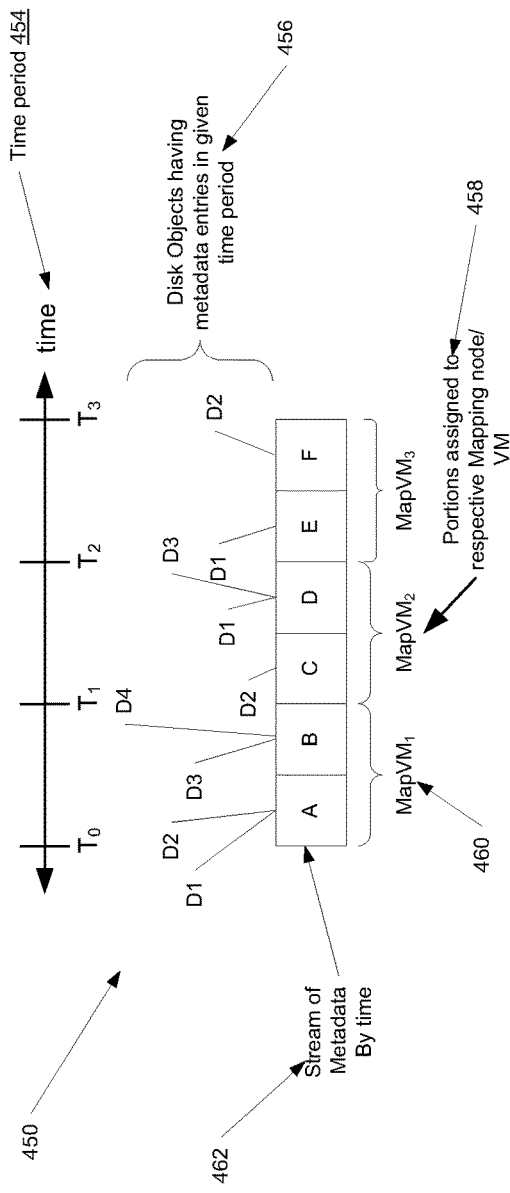
FIG. 5B is a simplified diagram illustrating a portion of the map/reduce process of FIG. 5A, in accordance with at least one illustrative embodiment.
FIG. 5C is a simplified table illustrating a portion of the map/reduce process of FIG. 5B, in accordance with at least one illustrative embodiment.
Figure 6:
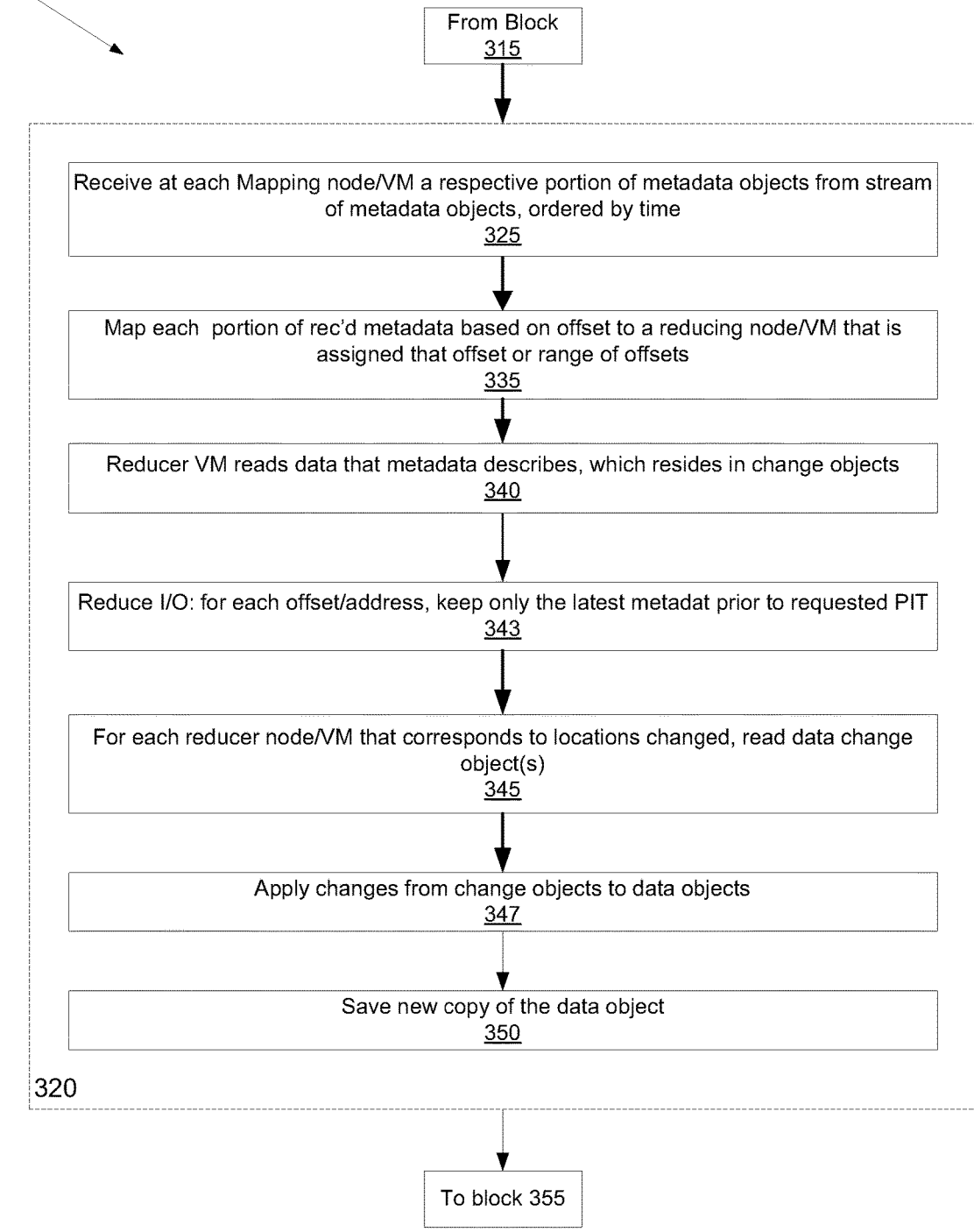
FIG. 6 is a third flowchart illustrating a portion of the second method of FIG. 5A in further detail, in accordance with at least one illustrative embodiment of the instant disclosure.
Figure 7:
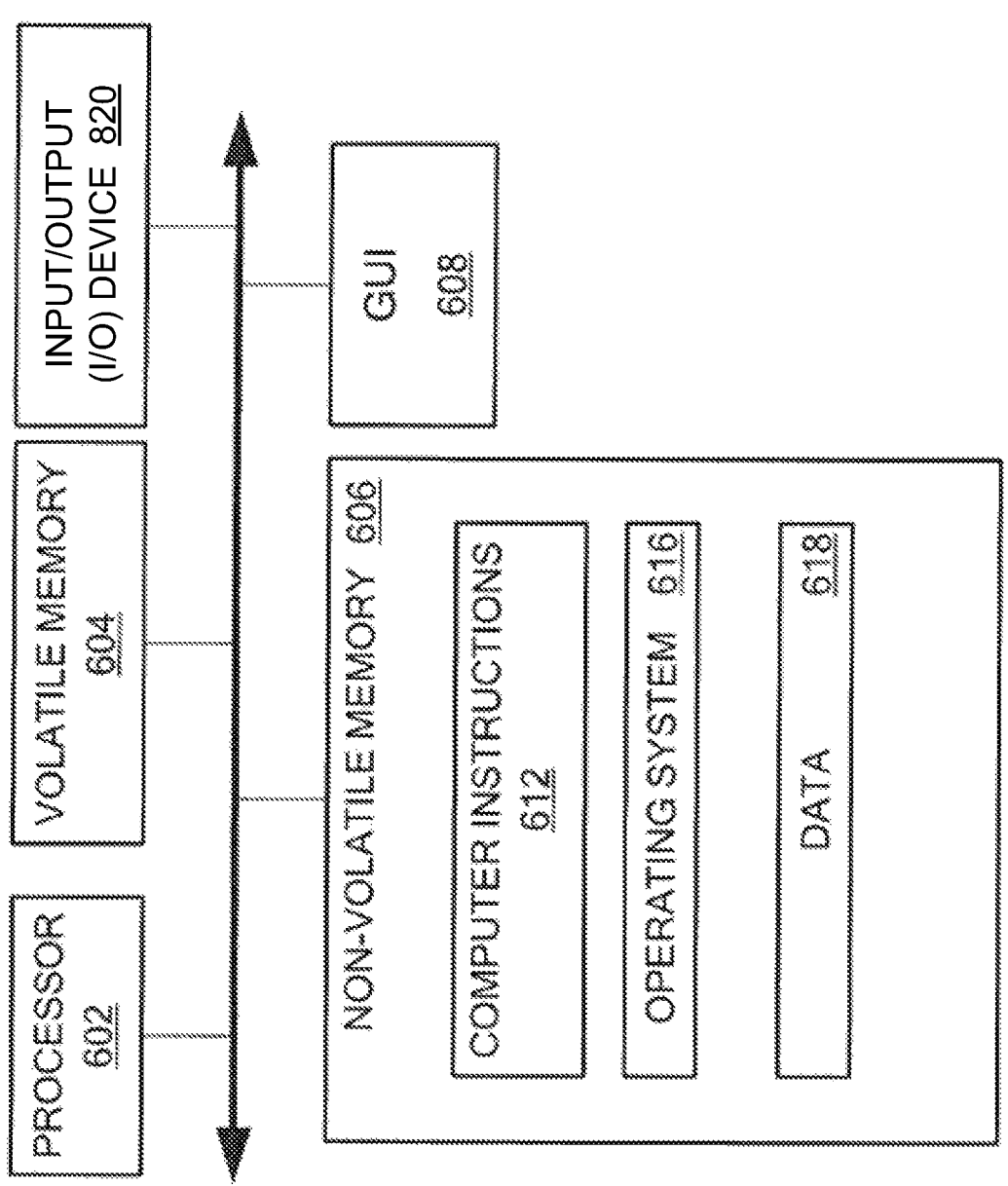
Figure 8:
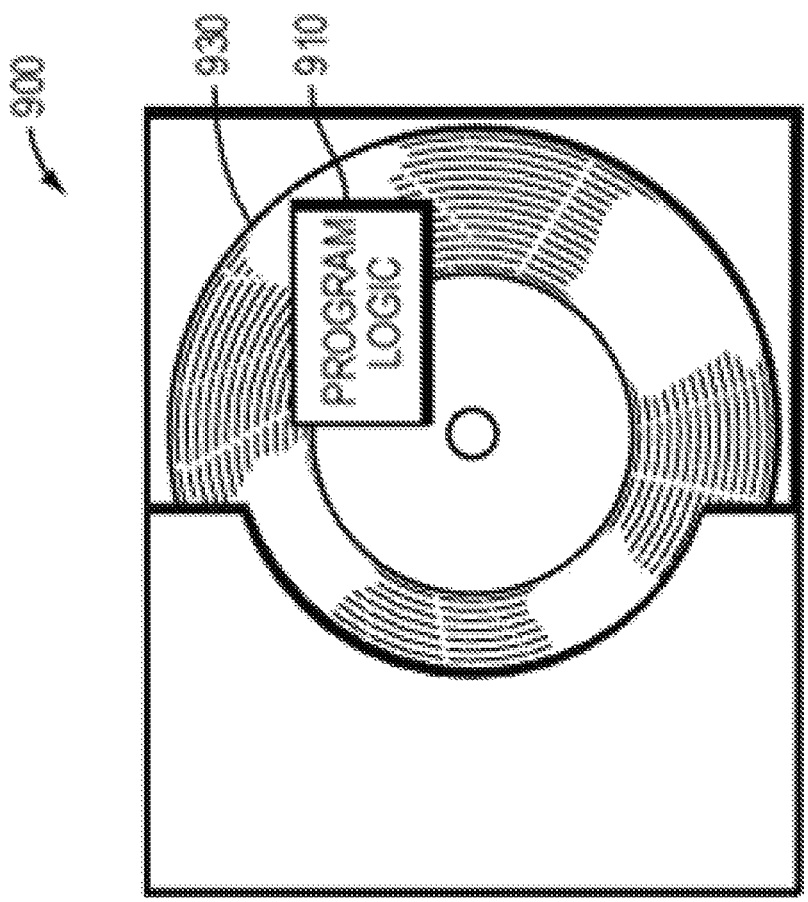

FIG. 7 is a simplified block diagram of an example of an apparatus that may perform at least a portion of the processes in FIGS. 4-6; and FIG. 8 is a simplified example of an embodiment of a method embodied on a computer readable storage medium that may utilize at least some of the techniques described herein, including at least those described in FIGS. 4-6, in accordance with at least one embodiment of the present disclosure.

DETAILED DESCRIPTION

Before describing embodiments of the concepts, structures, and techniques sought to be protected herein, some terms are explained. In particular, the following may be helpful in understanding the specification and claims:

In certain embodiments, the term "I/O request" or simply "I/O" may be used to refer to an input or output request, such as a data read or data write request. In certain embodiments, a SAN may be a storage area network of nodes (also called devices) that send and receive I/O and other requests, each node in the network being an initiator or a target, or both an initiator and a target. In certain embodiments, an initiator may be a node in a SAN that issues I/O requests. In certain embodiments, a target may be a node in a SAN that replies to I/O requests. In certain embodiments, a node can provide at least a processor function. In certain embodiments, a node can include both a processor function and a memory function.

In certain embodiments, a host may be at least one computer or networks of computers that runs at least one data processing application that issues I/O requests to one or more storage systems and that can communicate with its corresponding storage system using small computer system interface (SCSI) commands. In some embodiments, a host is an initiator with a SAN, and a host may be a virtual machine. In certain embodiments, a host device may be an internal interface in a host, to a logical storage unit. In certain embodiments, a production site may be a facility where one or more host computers run data processing applications that write data to a storage system and read data from the storage system; may be a virtual or physical site. In certain embodiments, a backup site may be a facility where replicated production site data is stored; the backup site may be located in a remote site or at the same location as the production site; a backup site may be a virtual or physical site. In certain embodiments, a back-up site may be an object store.

In certain embodiments, an object may represent a logical construct containing data. In some embodiments herein, an object containing metadata may be referred to as a metadata object. In certain embodiments, as used herein, a change object may refer to an object with accumulated I/O. In certain embodiments, an object store (also referred to as object storage) may be a storage architecture that manages data as objects, in contrast to file systems which manage data as a file hierarchy and block storage which manages data as blocks within sectors and tracks. Each object includes the data itself, a variable amount of metadata, and a globally unique identifier, where the object store can be implemented at multiple levels, including the device level (object storage device), the system level, and the interface level. In certain embodiments, a cloud may provide an object store. For example, in at least some embodiments, a cloud is an off-premise form of computing that stores data on the Internet.

In certain embodiments, a storage device may refer to any non-volatile memory (NVM) device, including hard disk drives (HDDs), solid state drivers (SSDs), flash devices (e.g., NAND flash devices), and similar devices that may be accessed locally and/or remotely (e.g., via a storage attached network (SAN)). In some embodiments, the term "storage device" may also refer to a storage array including multiple storage devices. In certain embodiments, a storage medium may refer to one or more storage mediums such as a hard drive, a combination of hard drives, flash storage, combinations of flash storage, combinations of hard drives, flash, and other storage devices, and other types and combinations of computer readable storage mediums including those yet to be conceived. A storage medium may also refer both physical and logical storage mediums and may include multiple level of virtual to physical mappings and may be or include an image or disk image. A storage medium may be computer-readable, and may also be referred to herein as a computer-readable program medium.

In certain embodiments, a storage system may be a SAN entity that provides multiple logical units for access by multiple SAN initiators, and in some embodiments, the term "storage system" may encompass physical computing systems, cloud or virtual computing systems, or a combination thereof. In certain embodiments, a WAN may be a wide area network that connects local networks and enables them to communicate with one another, such as the Internet. In certain embodiments, a virtual volume may be a volume which is exposed to host by a virtualization layer, the virtual volume may be spanned across more than one site and or volumes. In certain embodiments, a volume may be an identifiable unit of data storage, either physical or virtual; that is, a volume can be a removable hard disk, but is not limited as being a unit that can be physically removed from a computer or storage system.

In certain embodiments, a logical unit (LU) may be a logical entity provided by a storage system for accessing data from the storage system, and as used herein a logical unit is used interchangeably with a logical volume. In many embodiments herein, a LU or LUN may be used interchangeable for each other. In certain embodiments, a LUN may be a logical unit number for identifying a logical unit; may also refer to one or more virtual disks or virtual LUNs, which may correspond to one or more Virtual Machines. In certain embodiments, a physical storage unit may be a physical entity, such as a disk or an array of disks, for storing data in storage locations that can be accessed by address, where physical storage unit is used interchangeably with physical volume.

In certain embodiments, a DPA may be Data Protection Appliance a computer or a cluster of computers, or a set of processes that serve as a data protection appliance, responsible for data protection services including inter alia data replication of a storage system, and journaling of I/O requests issued by a host computer to the storage system. The DPA may be a physical device, a virtual device running, or may be a combination of a virtual and physical device. In most embodiments, a DPA may accumulate I/O and package it into an object. In many embodiments, a DPA may accumulate I/O until a certain or predetermined size, such as one megabyte, is reached. In most embodiments, a DPA may send a data object representing I/O to a cloud. In certain embodiments, an RPA may be replication protection appliance, which may be used interchangeable with and is another name for DPA. In certain embodiments, a RPA may be a virtual DPA or a physical DPA. In certain embodiments, a DPA may track metadata about changes corresponding to I/O in an object.

In certain embodiments, a splitter (also referred to as a protection agent) may be an agent running either on a production host a switch or a storage array, or in a network, or at a hypervisor level. A splitter, in certain embodiments, can intercept I/O's and split them to a DPA and to the storage array, fail I/O's, redirect I/O's or do any other manipulation to the I/O's. The splitter or protection agent may be used in both physical and virtual systems. The splitter may be in the I/O stack of a system and may be located in the hypervisor for virtual machines. In some embodiments, I/O sent to a LUN or LU on a production site may be intercepted by a splitter. In many embodiments, a splitter may send a copy of I/O sent to LUN or LU to a data protection appliance or data protection application (DPA). In some embodiments, splitters can be array-based, fabric-based, or host based. In certain embodiments, marking on splitter may be a mode in a splitter where intercepted I/O's are not split to an appliance and the storage, but changes (meta data) are tracked in a list and/or a bitmap and I/O is immediately sent to down the 10 stack.

In at least some embodiments, a copy of a LUN or LU may be made, and such copy may include a set of objects, which may represent data on the LUN. In some embodiments, a copy of a LUN may include one or more metadata objects, which may describe how a set of objects representing data of the LUN correspond to or may be used to create the LUN. In at least some embodiments, a copy of a LUN or LU has a set of metadata objects and a set of objects may be sent to a cloud. In certain embodiments, a copy of a LUN or LU as a set of metadata objects and a set of objects may be sent to an object store. In certain embodiments, CRR (continuous remote replication) a may refer to a full replica of a volume or a set of volumes along with a journal which allows any point in time access at a site remote to the production volume and on a separate storage array.

In certain embodiments, a source side may be a transmitter of data within a data replication workflow, during normal operation a production site is the source side; and during data recovery a backup site is the source side; may be a virtual or physical site. In certain embodiments, a target side may be a receiver of data within a data replication workflow. During normal operation a back site is the target side, and during data recovery a production site is the target side. A target site may be a virtual or physical site, and a target site may be referred to herein as a replication site.

In certain embodiments, an image may be a copy of a logical storage unit at a specific point in time. In certain embodiments, a clone may be a copy or clone of the image or images, and/or drive or drives of a first location at a second location. In some embodiments, a clone may be made up of a set of objects. In certain embodiments, a snapshot may refer to differential representations of an image, i.e. the snapshot may have pointers to the original volume, and may point to log volumes for changed locations. Snapshots may be combined into a snapshot array, which may represent different images over a time period. In some embodiments, a snapshot can include a full volume copy, also known as a mirror, clone, or business continuance volume as well as a partial copy, where only changed data, or pointers to changed data, is kept. In certain embodiments, a point in time (PIT) image may be a point-in-time snapshot, such as a copy of a storage volume, file or database as it appeared at a given point in time. In some embodiments, PIT images can be used as method of data protection. A description of certain methods associated with creating PIT snapshots of a volume may be described in U.S. Pat. No. 8,996,460, entitled "Accessing an Image in a Continuous Data Projection Using Deduplication-Based Storage," which is hereby incorporated by reference; however it will be understood that many different method of creating PIT images are applicable.

At least some disclosed embodiments may enable replication to a cloud. At least some embodiments may enable to replication to an object store. At least some embodiments may enable replication to a cloud with an object store. In some embodiments, replication to an object store may include sending objects representing changes to one or more LUNS on a production site to an object store. In many embodiments, an object store may have a copy of a LUN as a set of objects and a set of metadata objects. In these embodiments, as I/O occurs to the LUN, the object store may receive a set of change objects corresponding to the changes written to the LUN. In these embodiments, the object store may receive a set of metadata objects describing the changes to the LUN in the objects. In most of these embodiments, the set of change objects and the set metadata objects may be used as a journal. In most of these embodiments, using the set of metadata objects, one or more portions of the or more of the change objects may be applied to the create new objects to replace the set of objects and the set of metadata objects corresponding to the copy of the LUN. In most of these embodiments, by replacing objects and metadata objects corresponding to the LUN, it may move the copy of the LUN to a future point in time. In some of these embodiments, by keeping the original set of metadata objects and objects, it may be possible to access the original LUN as well as any point in time. In most of these embodiments, by reading the metadata objects describing the set of change objects, multiple points of time may be created on the cloud site. In further embodiments, metadata objects may be created that correspond to information about how to move a new point in time back to a previous point in time.

In certain embodiments, a journal may be a record of write transactions (e.g., I/O data) issued to a storage system, which may be used to maintain a duplicate storage system, and to roll back the duplicate storage system to a previous point in time. In some embodiments, the journal includes a redo log that includes changes that occurred to a production volume and not yet applied to the replica/duplicate, and an undo log having a list of changes that undo the latest changes in the replica/duplicate volume. In some embodiments, each entry in a journal contains, apart from the I/O data itself, I/O metadata that can include information such as a volume identifier (ID), the I/O block offset within the volume, the I/O length, and a time stamp of the I/O.

In certain embodiments, a delta marking stream may mean the tracking of the delta between the production and replication site, which may contain the metadata of changed locations. A delta marking stream may be kept persistently on the journal at the production site of the replication, based on the delta marking data the DPA knows which locations are different between the production and the replica and transfers them to the replica to make both sites identical.

In certain embodiments, virtual access may be an access method provided by the appliance and the splitter, in which the appliance exposes a virtual volume from a specific point in time to the host, the data for the virtual volume is partially stored on the remote copy and partially stored on the journal.

In many embodiments, a set of virtual machines may be used in the cloud or in the object store. In certain embodiments, a set of virtual machines in a cloud may process metadata objects describing the set of change objects to create a new point in time for a LUN. In many of these certain embodiments, the set of virtual machines may read a set of metadata objects corresponding to the set of change objects to create new objects to replace a set of original objects corresponding to a LUN. In further embodiments, a set of virtual machines may run periodically and/or on demand to create new points in time for an object store or cloud containing changes to a copy of a LUN.

In at least some embodiments, MapReduce refers at least to two separate and distinct tasks: a map task, which takes a set of data and converts it into another set of data, where individual elements are broken down into tuples (key/value pairs), and a reduce task, which takes the output from a map as input and combines those data tuples into a smaller set of tuples. In an exemplary MapReduce process, the reduce job is always performed after the map job. It will be appreciated that known MapReduce processes, are only one illustration of a type of process for processing and generating large data sets with a parallel, distributed algorithm on a cluster that is usable with at least some embodiments described herein. Those of skill in the art will appreciate that other types of parallel and/or distributed processes, especially those implemented in accordance with a programming model and an associated implementation for processing and generating large data sets with a parallel, distributed algorithm on a cluster, which splits input data set into independent chunks that are processed in a completely parallel manner, are implementable as an alternative to (or in addition to) MapReduce, to improve the efficiency of generating the PIT information, including but not limited to Apache products like Pig, Spark, Flink, and Hive.

Figure 1A:
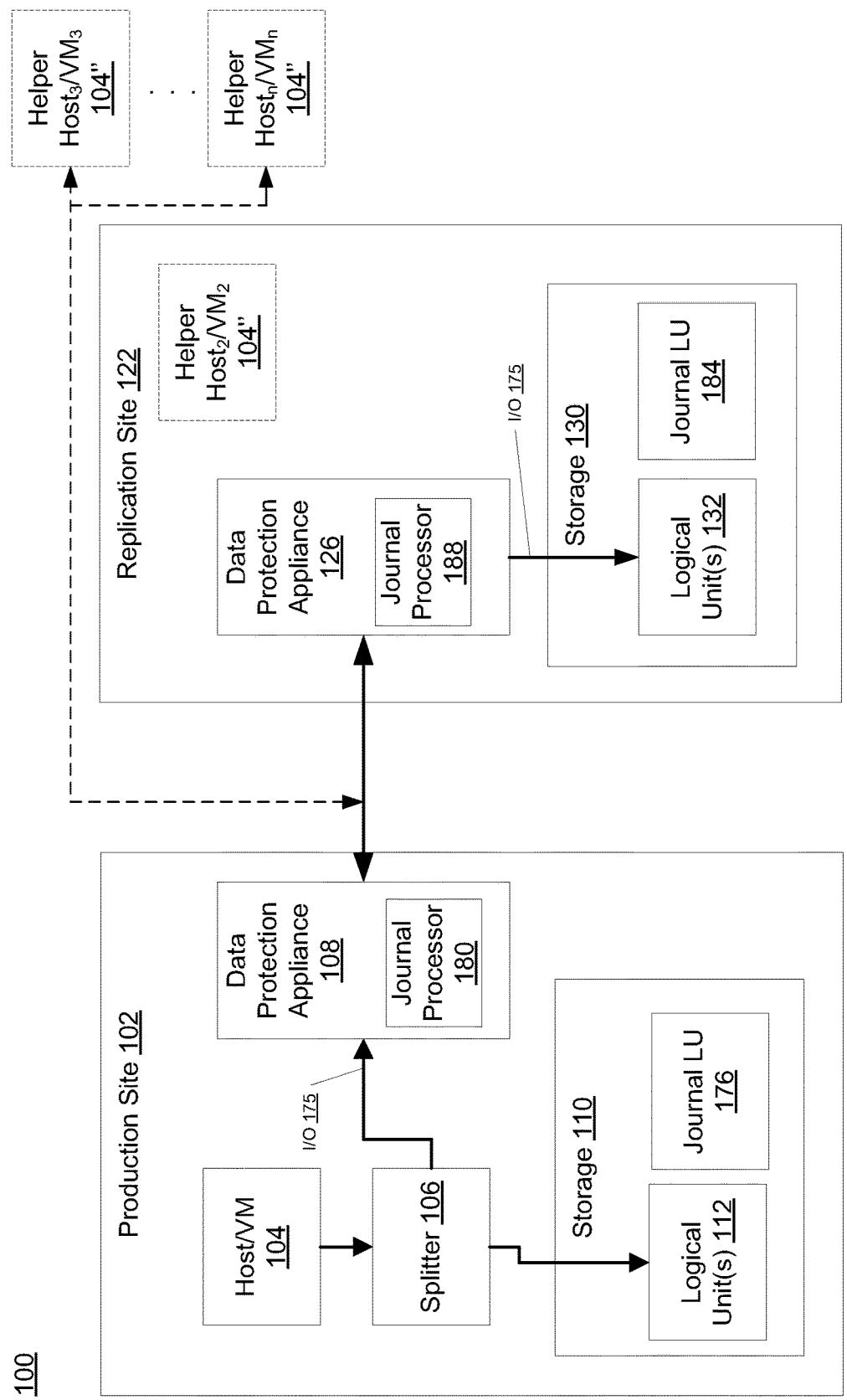
FIG. 1A is a first block diagram of a data protection system, in accordance with at least one illustrative embodiment of the instant disclosure.

Referring to the illustrative embodiment shown in FIG. 1A, data protection system 100 may include two sites, production site 102 (which in some embodiments can correspond to a source site) and replication site 122 (which in some embodiments can correspond to a target site). Production site 102 may generally be a facility where one or more hosts run data processing applications that write data to a storage system and read data from the storage system. Replication site 122 may generally be a facility where replicated production site data is stored. In such embodiments, production site 102 may back up (e.g., replicate) production data at replication site 122. Production site 102 has splitter 106, which splits I/O sent to LUN 112, such as I/O 175, by making a copy of the I/O and sending it to DPA 108. DPA 108 sends the I/O, such as I/O 175, to DPA 126 on replication site 122. DPA 126 on replication site 122 sends I/O 175 to LUN 132 on Replication site 122. In some embodiments, the DPA 126 manages a journal 184 of the data the replica site 122, as well as a full copy of the data.

Figure 1B:
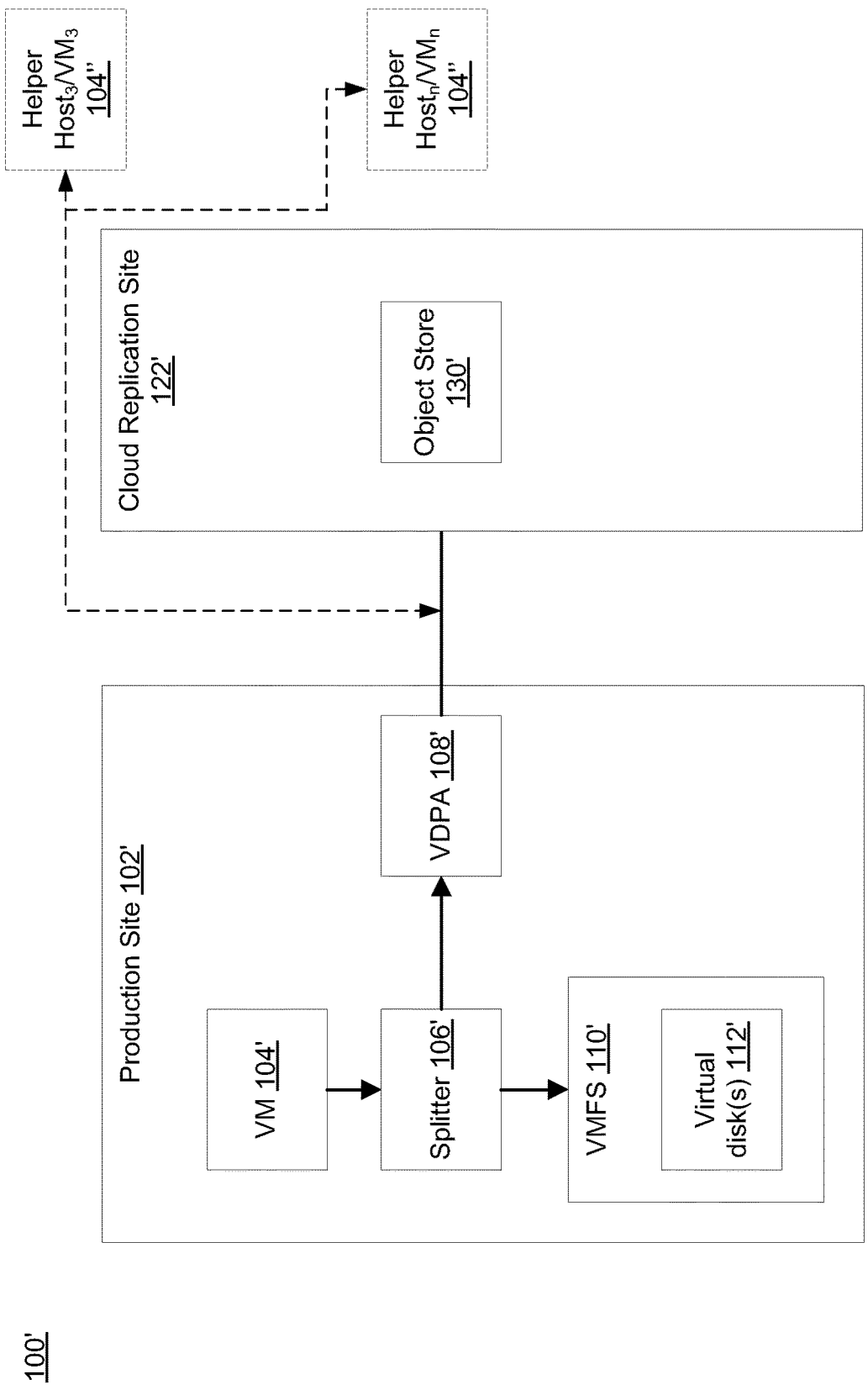
FIG. 1B is a second block diagram of a data protection system, using a cloud, in accordance with at least one illustrative embodiment of the instant disclosure.

Some embodiments of data protection system 100 may be provided as physical systems for the replication of physical LUs, or as virtual systems for the replication of virtual LUs. In certain embodiments, production site 102 and replication site 122 may be remote from one another. For example, as shown in FIG. 1B, replication site 122' may be implemented as one or more "virtual" or "cloud" replication sites located remotely from production site 102' and in communication via a WAN or other network link (e.g., the Internet, etc.) (not shown). As will be appreciated, local data protection may have the advantage of minimizing data lag between target and source, and remote data protection may have the advantage of being robust in the event that a disaster occurs at the source site.

Referring again to FIG. 1A, replication site 122 may replicate production site data and enable rollback of data of production site 102 to an earlier point in time (PIT). Rollback may be used in the event of data corruption of a disaster, or alternatively in order to view or to access data from an earlier point in time. In some embodiments, replication may be triggered manually (e.g., by a user) or automatically. In certain embodiments, the data protection system 100 may include a failover mode of operation, wherein the direction of replicated data flow is reversed (e.g., where production site 102 may behave as a target site and replication site 122 may behave as a source site.

As shown in FIGS. 1A and 1B, production site 102 may include a host (FIG. 1A) or virtual machine (VM) (FIG. 1B) 104, splitter 106, storage (or storage array) 110, and a data protection appliance (DPA) 108. A host computer may be one computer, or a plurality of computers, or a multiprocessor system, or a network of distributed computers. Each computer may include, among other things, a conventional CPU, volatile and non-volatile memory, a data bus, an I/O interface, a display interface, and a network interface. In some embodiments, a host computer runs at least one data processing application, such as a database application and an e-mail server. In some embodiments, host 104 may write to a logical unit in storage 110. In embodiments such as shown in FIG. 1B, VM 104' may write to virtual disk(s) 112' in a virtual machine file system (VMFS) 110'. Replication site 122 may include DPA 126 and storage 130. In some embodiments, host 104 may include one or more devices (or "nodes") that may be designated an "initiator," a "target", or both, coupled by communication links appropriate for data transfer, such as an InfiniBand (IB) link or Fibre Channel (FC) link, and/or a network, such as an Ethernet or Internet (e.g., TCP/IP) network that may employ, for example, the iSCSI protocol. In addition, in at least some embodiments (as further described herein), as shown in FIG. 1B, additional hosts or virtual machines 104" maybe operably coupled to the cloud replication site 122' (or generated, in the case of virtual machines), as necessary or "on demand", as shown via the dotted lines in FIG. 1B. This may be advantageous, for example, in the embodiments described further herein that can, in certain instances, utilize multi-parallel processing (also known as massively parallel processing) to perform MapReduce and other related processes, to more efficiently create or rebuild point in time (PIT) information "on demand," as will be understood. As further explained herein, in some embodiments, as shown in FIG. 1B, data from the production site 102' (i.e., "on premises) is sent directly to the object store 130' in the cloud, and this data can be operated on in a multi-parallel way bringing up virtual machines 104' to the work on the objects periodically in the cloud (e.g., as needed, such as during the multi-parallel map reduce process described further herein).

Referring again to FIG. 1A, storage 110 and storage 130 may include storage devices for storing data, such as disks or arrays of disks. Storage 110 may provide (e.g., expose) one or more logical units (LUs) 112 to which production commands are issued, while storage 130 may provide (e.g., expose) one or more logical units (LUs) 132 to which replication commands are issued.

Figure 3:
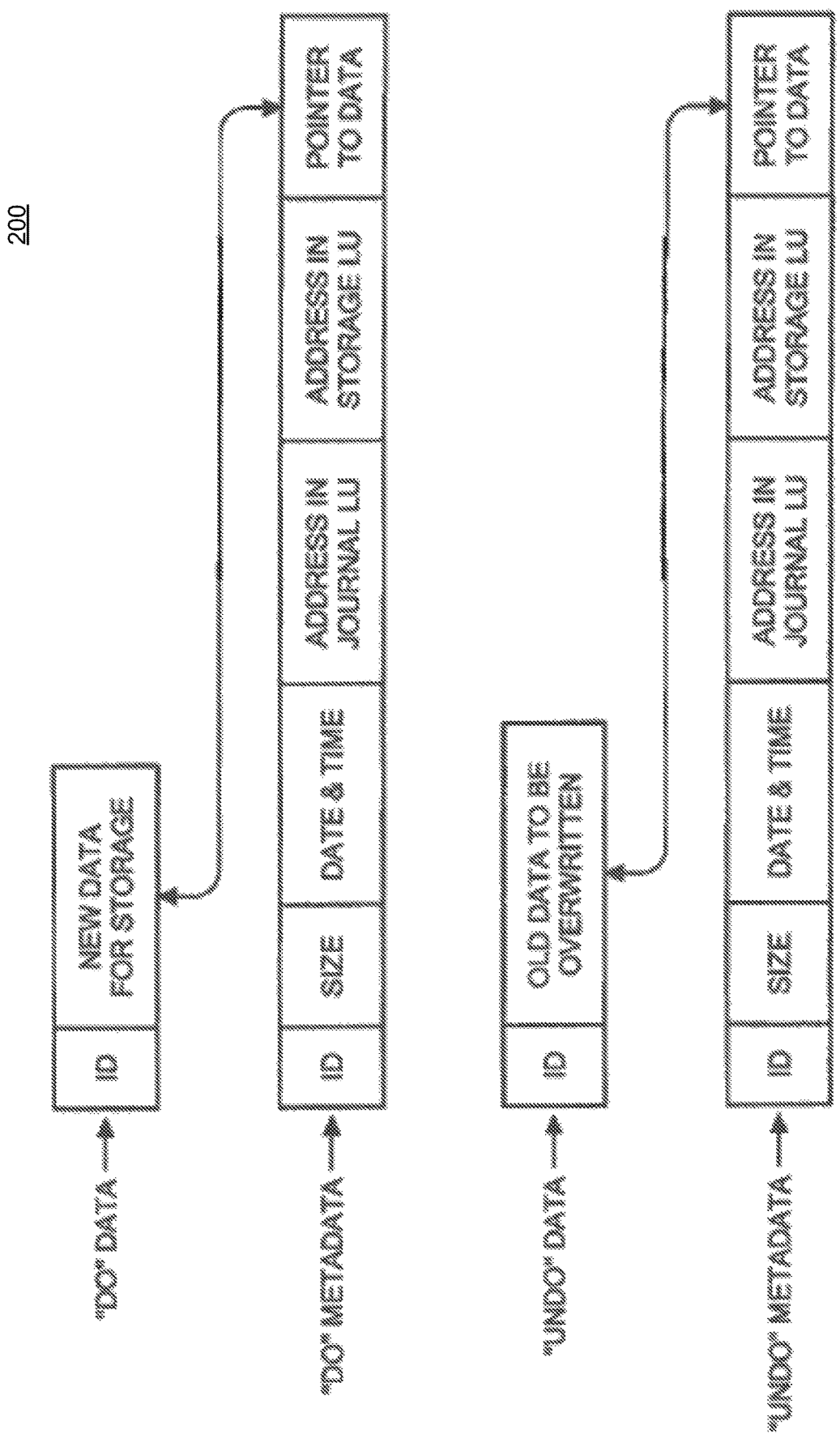
FIG. 3 is a diagram illustrating a journal history of write transactions for the data protection systems of FIGS. 1A-2D, in accordance with at least one illustrative embodiment of the instant disclosure.

Storage system 110 may expose a journal LU 176 for maintaining a history of write transactions made to LU 112, referred to herein as a "journal." In some embodiments, a journal may be used to provide access to storage at specified points-in-time (PITs), as discussed in greater detail in regard to FIG. 3. In some embodiments, the journal may be stored across multiple LUs (e.g., using striping, etc.). In some embodiments, DPA 108 may include a journal processor 180 for managing the journal within journal LU 176. In some embodiments, journal processor 180 may manage the journal entries of LU 112. Specifically, in some embodiments, journal processor 180 may enter write transactions received by DPA 108 from the replication site DPA 126 into the journal by writing them into journal LU 176, read the undo information for the transaction from LU 112, update the journal entries in journal LU 176 with undo information, apply the journal transactions to LU 112, and remove already-applied transactions from the journal.

In some embodiments, a snapshot replica may be a differential representation of a volume. For example, the snapshot may include pointers to the original volume, and may point to log volumes for locations of the original volume that store data changed by one or more I/O requests. In some embodiments, snapshots may be combined into a snapshot array, which may represent different images over a time period (e.g., for multiple PITs).

In some embodiments, DPA 108 and DPA 126 may perform various data protection services, such as data replication of storage system 100, and journaling of I/O requests issued by device 104. DPA 108 and DPA 126 may also enable rollback of production data in storage 110 to an earlier point-in-time (PIT) from replica data stored in storage 130, and enable processing of rolled back data at the target site. In some embodiments, rollback may be used in the event of data corruption of a disaster, or alternatively in order to view or to access data from an earlier point in time. In some embodiments, each DPA 108 and DPA 126 may be a physical device, a virtual device, or may be a combination of a virtual and physical device.

In the architecture illustrated in FIG. 1A, DPA 108 and DPA 126 are standalone devices integrated within a SAN. Alternatively, each of DPA 108 and DPA 126 may be integrated into storage system 110 and storage system 130, respectively, or integrated into host computer 104 (as well as any other component or computer at replication site 122). Both DPAs communicate with their respective host computers through communication lines such as fiber channels using, for example, SCSI commands, or any other protocol. In at least some embodiments, the replica site only has object storage.

In some embodiments, DPA 108 may receive commands (e.g., SCSI commands) issued by device 104 to LUs 112. For example, splitter 106 may intercept commands from device 104, and provide the commands to storage 110 and also to DPA 108. In some embodiments, the splitter 106 may intercept data operations at several logical levels. In some embodiments, the splitter helps in replication of block level devices and intercepts I/O at the SCSI layer. In some embodiments, splitter 106 may act on intercepted SCSI commands issued to a logical unit in one of the following ways: send the SCSI commands to its intended LU; redirect the SCSI command to another LU; split the SCSI command by sending it first to DPA 108 and, after DPA 108 returns an acknowledgement, send the SCSI command to its intended LU; fail a SCSI command by returning an error return code; and delay a SCSI command by not returning an acknowledgement to the respective host. In some embodiments, splitter 106 may handle different SCSI commands, differently, according to the type of the command. For example, in some embodiments, a SCSI command inquiring about the size of a certain LU may be sent directly to that LU, whereas a SCSI write command may be split and sent to DPA 108.

In certain embodiments, splitter 106 and DPA 126 may be drivers located in respective host devices of production site 102 and replication site 122. Alternatively, in some embodiments, a protection agent may be located in a fiber channel switch, or in any other device situated in a data path between host/VM 104 and storage 110. In a virtualized environment, the protection agent may run at the hypervisor layer or in a virtual machine providing a virtualization layer. For example, in such embodiments, a hypervisor may consume LUs and may generate a distributed file system on the logical units such as Virtual Machine File System (VMFS) that may generate files in the file system and expose the files as LUs to the virtual machines (each virtual machine disk is seen as a SCSI device by virtual hosts). In another embodiment, a hypervisor may consume a network based file system and expose files in the Network File System (NFS) as SCSI devices to virtual hosts. It will be appreciated that use of SCSI format is not mandatory, and a hypervisor may consume files as disks with other protocols, such as SATA or proprietary protocols.

In some embodiments, production DPA 108 may send its write transactions to replication DPA 126 using a variety of modes of transmission, such as continuous replication or snapshot replication. For example, in continuous replication, production DPA 108 may send each write transaction to storage 110 and also send each write transaction to replication DPA 126 to be replicated on storage 130. In snapshot replication, production DPA 108 may receive several I/O requests and combine them into an aggregate "snapshot" or "batch" of write activity performed to storage 110 in the multiple I/O requests, and may send the snapshot to replication DPA 126 for journaling and incorporation in target storage system 120. In such embodiments, a snapshot replica may be a differential representation of a volume. For example, the snapshot may include pointers to the original volume, and may point to log volumes for locations of the original volume that store data changed by one or more I/O requests. In some embodiments, snapshots may be combined into a snapshot array, which may represent different images over a time period (e.g., for multiple PITs).

Figure 2A:
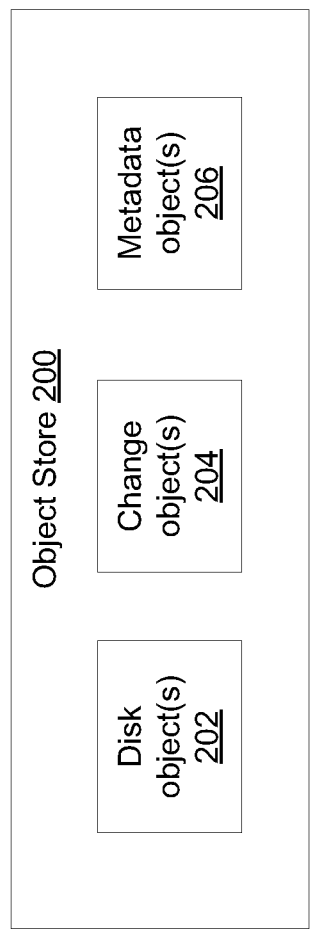
FIG. 2A is a block diagram of an object store of the data protection system of FIG. 1B, in accordance with an illustrative embodiment.

As shown in FIG. 1B, in some embodiments, a copy of a LUN or LU may be stored in an object store (e.g., object store 130' of FIG. 1B) of replication site 122'. Object store 130' may be implemented similar to the object store 200 as shown in FIG. 2A, and may include a set of objects 202, 204, 206, that may represent data of the LUN. For example, in some embodiments, object store 200 may include one or more disk objects 202, one or more change objects 204, and one or more metadata objects 206. Disk objects 202 may include data stored in the LUN at a specific point in time and can be associated with data stored in a copy of an LU or virtual disk at a point in time of the production site. As will be described, change objects may represent changes to data of the LUN over time. For example, in some embodiments, change objects can be associated with one or more input/output (I/O) operations on the production site. Metadata objects 206 may describe how a set of objects representing data of the LUN correspond to or may be used to create the LUN. In some embodiments, metadata objects are associated with the change object. In some embodiments, object store 200 may be in a cloud replication site. Replication may include sending objects representing changes to one or more LUNs on production site 102 to the replication site.

Referring again to FIGS. 1A and 1B, input/output (I/O) requests sent to a LUN or LU (e.g., 112) on a production site (e.g., 102) may be intercepted by a splitter (e.g., 106, 106'). The splitter may send a copy of the I/O to a DPA (e.g., DPA 108, VDPA 108'). The DPA may accumulate multiple I/O's into an object (e.g., disk objects 202). A change object (e.g., change objects 204) may refer to an object with accumulated I/O where each I/O may change data in the disk objects. The DPA may accumulate I/O until a certain size is reached, and may then send disk object(s) and change objects representing the accumulated I/O to a cloud replication site (e.g., 122') that may include an object store (e.g., 130'). In some embodiments, DPA 108 may track metadata about changes corresponding to accumulated I/O in an object as metadata objects 206. DPA 108 may send metadata objects to a cloud or an object store when the metadata object reaches a certain size. In some embodiments, DPA 108 may package the disk objects, change objects and metadata objects into an object to send to a cloud replication site.

In at least some described embodiments, as I/O occurs to the production site LUN, object store 200 may receive a set of change objects corresponding to the changes written to the LUN. In these embodiments, the object store may receive a set of metadata objects describing the changes to the LUN in the objects. Thus, the set of change objects and the set metadata objects may be used as a journal. In such embodiments, the metadata objects and one or more portions of the change objects may be used to create new disk objects to move the copy of the LUN to a different point in time. For example, by keeping the original set of metadata objects and objects, it may be possible to access the original LUN and any point in time (PIT). By reading the metadata objects describing the set of change objects, multiple PITs may be created on the cloud replication site. In some embodiments, objects and metadata may be maintained to provide a protection window of storage system 100. For example, a protection window may correspond to a time period during which changes to a LUN are tracked. Objects and metadata objects that correspond to a PIT outside of a protection window may be deleted.

For example, referring to FIG. 2B, the relationship between the data objects of object store 200' and the LUNs of storage 110" is shown. As shown in FIG. 2B, at a first time, t1, image 1 of storage 110" may be generated. Image 1 includes a plurality of disk objects, shown as disk objects 1-N, each disk object corresponding to a respective section of associated LUN 112' of storage 110", each section shown as shown as a respective range or block of addresses or offsets in the LUN 112". One or more metadata objects 206' may include information about each of the disk objects 1-N of image 1. As changes are made to the data stored in LUNs 1-N of storage 110" (e.g., in response to write requests), one or more change objects 204' may be stored in object store 200'. The change objects 204' may include data or pointers to data that was modified from the data stored in disk objects 1-N of image 1. In some embodiments, the change objects 204' include, for each I/O: metadata 204a', a time stamp 204b', disk location 204c', I/O size 204d', and the data of the 10 itself 204e'. One or more metadata objects 206' may also include information about associations between change objects 204' and the disk objects 1-N of image 1 (e.g., if a given change object represents a change to a given disk object). As used in FIG. 2B, N represents a given number of objects, and may be an integer greater than or equal to 1.

Figure 2C:
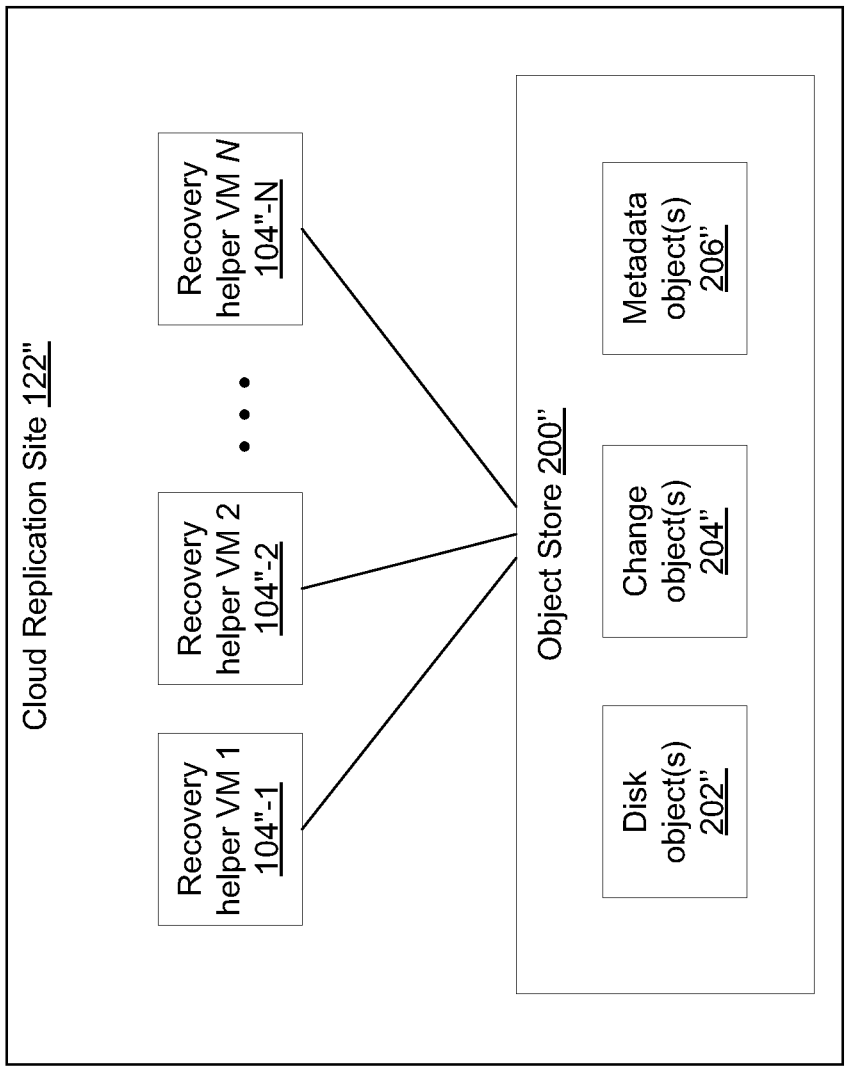
FIG. 2C is a block diagram showing recovery helper virtual machines in relation to the object store of FIG. 2A, in accordance with an illustrative embodiment.

Referring to FIG. 2C, an illustrative block diagram is shown of cloud replication site 122" having one or more recovery helper virtual machines (VMs), shown as recovery helper VMs 1-N. As described, one or more VMs may be generated to serve as a plurality of nodes that help to generate, concurrently, one or more PITs from the data stored in object store 200", wherein, advantageously, in at last some embodiments, a MapReduce process can be employed to improve the speed at which the PIT is created. Although shown in FIG. 2B as only including a single image (image 1), in general, object store 200' of FIG. 2C may include a plurality of images, with each image including full disk data (e.g., disk objects) of storage 110".

Figure 2D:
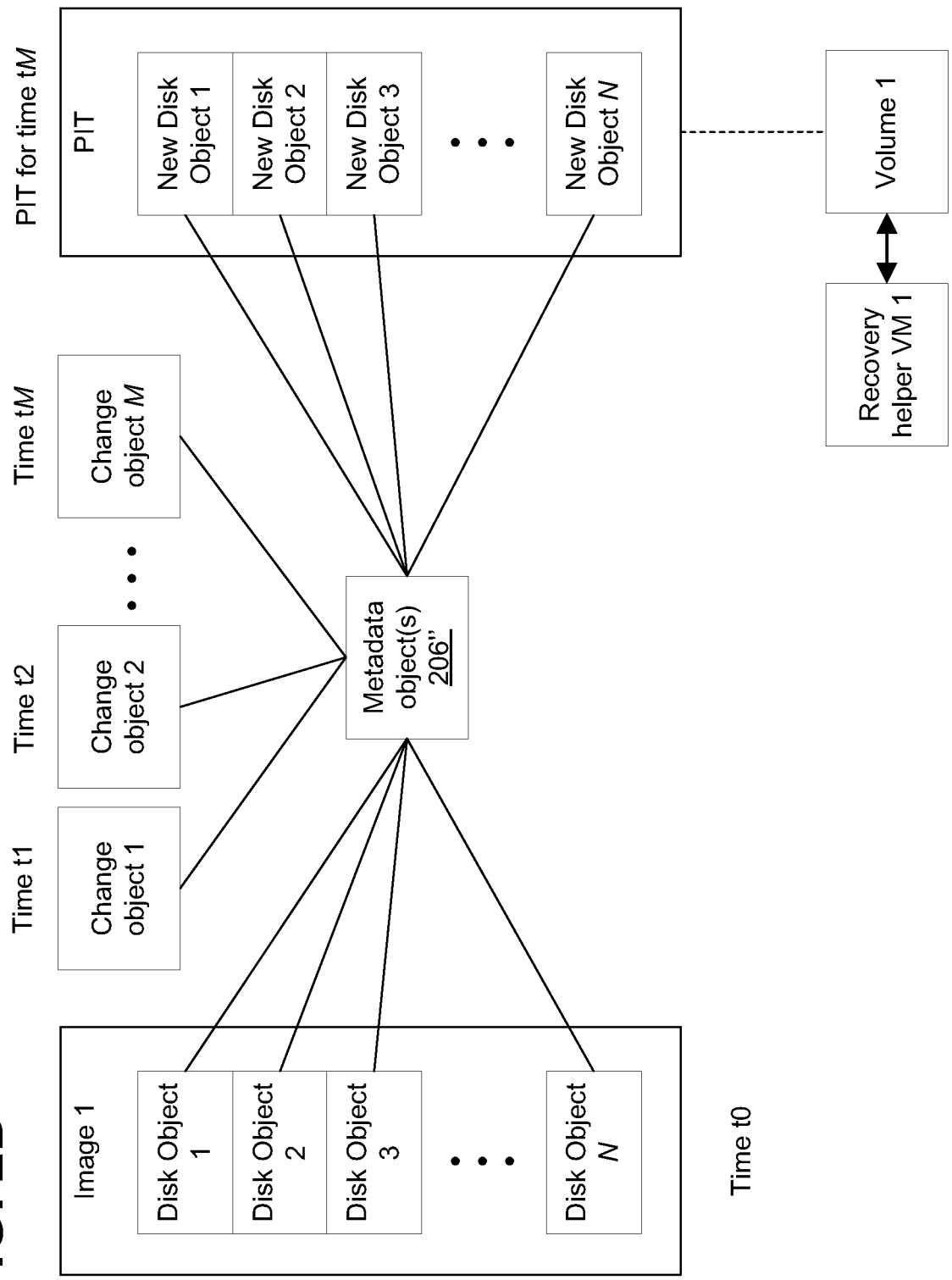
FIG. 2D is a block diagram showing an illustrative relationship between objects in the object store of FIG. 2A to generate points in time, in accordance with an illustrative embodiment

For example, as shown in FIG. 2D, the images may be taken at specific time intervals, and between the image time intervals, one or more change objects 204' may allow recovery to various points in time between the image time intervals. For example, image 1 may be generated at time to, and include full data (e.g., disk objects) of storage 110". Each change object 204' may correspond to changes that occurred at a specific time, shown as change objects 1-M, occurring at times t1-tM. By modifying an earlier image (e.g., image 1) with changes indicated in the one or more change objects, recovery can be made to a point in time between image intervals, shown as PIT for time tM. Metadata objects 206" may indicate the relationship between disk objects 1-N and change objects 1-M, which allow a new full disk image (e.g., new disk objects 1-N) to be generated to a given PIT. The PIT may then be copied to an associated volume, shown as volume 1, to be operated upon by an associated virtual machine, shown as recovery helper VM 1.

In some embodiments, one or more virtual machines may be used in the cloud or in the object store to process disk objects, change objects, and metadata objects describing the change objects to create and/or rebuild a new PIT for a LUN. For example, the virtual machines may create new metadata objects to describe the LUN at a future point in time, where the new metadata objects may reference some of the original disk objects corresponding to the LUN and new objects that replace one or more of the original objects corresponding to the LUN.

In some embodiments, the virtual machines may be created (e.g., brought up) and run periodically to process change objects and metadata objects and/or to create new PITs for an object store or cloud containing changes to a copy of a LUN. In some embodiments, if virtual machines operate periodically, there may not need to use compute power in the cloud (e.g., at the replication site) other than when the virtual machines are miming. The virtual machines may process a set of change objects and a set of metadata objects to create a journal to enable a PIT to be rolled forward or backward in time. In some embodiments, the journal may be represented by a set of objects.

As described herein, a set of change objects that contain change data, and a set of metadata objects describing the change data may enable recovering or recreating the production site LUN from the replica data if a failure occurs on the production site.

Described embodiments may perform cloud recovery to multiple points in time (PITs). As described herein, storage system 100 may generate multiple snapshots of the replica copy of the LUN, each snapshot corresponding to a different PIT. Each snapshot may include one or more objects (e.g., as shown in FIG. 2) associated with LUNs of the snapshot. The objects may be used by replication site 122 to create a journal. By applying a portion of the journal (e.g., change objects) to disk data objects, multiple PITs may be recovered.

In some embodiments, storage system 100 may perform a recovery operation by initiating one or more virtual machines 104" in the cloud (e.g., at the replication site) in parallel, as needed, to apply journal data (e.g., change objects) to the volume data (e.g., disk objects). Thus, described embodiments may rebuild a PIT "on demand", using a multi-parallel process if necessary, with map reduce, with multiple nodes (if necessary) able to independently and simultaneously generate and/or rebuild a PIT, providing a process that is faster than known processes for generating/rebuilding a PIT, and also which, in some embodiments, can be configured to bring in or generate additional nodes only when needed, helping to reduce resource needs required to create the PIT. Thus, it is possible, in some embodiments, to create multiple points in time independently but also to create a single point in time in a multi-parallel manner.

In addition, in at least some embodiments, the rebuilding of the PIT is done using the object store 200' and multiple virtual machines 104" accessing it, and not a single machine running the workload over block devices.

FIG. 3 is a diagram illustrating a journal history of write transactions for the data protection systems of FIGS. 1A-2D, in accordance with at least one illustrative embodiment of the instant disclosure. Referring to FIG. 3, in some described embodiments, a write transaction 200 may be included within a journal and stored within a journal LU. In some embodiments, write transaction 200 may include one or more identifiers and a time stamp indicating the date and time at which the transaction was received by the source DPA. In some embodiments, write transaction 200 also includes a write size indicating the size of the data block; a location in the journal LU where the data is entered; a location in the target LU where the data is to be written; and the data itself.

Referring to FIGS. 1A-2D and 3, in some embodiments, transaction 200 may correspond to a transaction transmitted from production DPA 108 to replication DPA 126. In some embodiments, production DPA 108 may record write transaction 200 in the journal that includes four streams. In some embodiments, a first stream, referred to as a "DO" stream, includes a copy of the new data for writing to LU 112. In some embodiments, a second stream, referred to as a "DO METADATA" stream, includes metadata for the write transaction, such as an identifier, a date and time, a write size, the offset within LU 112 where the new data is written, and a pointer to the offset in the DO stream where the corresponding data is located. In some embodiments, a third stream, referred to as an "UNDO" stream, includes a copy of the data being overwritten within LU 112 (referred to herein as the "old" data). In some embodiments, a fourth stream, referred to as an "UNDO METADATA" stream, includes an identifier, a date and time, a write size, a beginning address in LU 112 where data was (or will be) overwritten, and a pointer to the offset in the UNDO stream where the corresponding old data is located.

In some embodiments, since the journal contains the "undo" information necessary to rollback storage system 100, data that was stored in specific memory locations at a specified point in time may be obtained by undoing write transactions that occurred subsequent to such point in time (PIT). In some embodiments, each of the four streams may hold a plurality of write transaction data. In some embodiments, as write transactions are received dynamically by the target DPA, the write transactions may be recorded at the end of the DO stream and the end of the DO METADATA stream, prior to committing the transaction. In some embodiments, a metadata stream (e.g., UNDO METADATA stream or the DO METADATA stream) and the corresponding data stream (e.g., UNDO stream or DO stream) may be kept in a single stream by interleaving metadata and data.

Having described a data protection system and journal history configuration in which at least some embodiments may be embodied, further details of at least some embodiments related to journal based replication and rebuilds of point-in-time copies using a multi-parallel process and map reduce will now be described. Although the following disclosure and certain example embodiments are described in connection with their use with data centers, DPAs, RPAs, hosts, SANs, LUNs, etc., it will be appreciated that the disclosures and embodiments herein are not limited to these applications, but can find applicability in virtually any type of computer system. In at least some aspects, embodiments are described herein create journal based replications to an object store target, including methods for doing a rebuild of point in time copies using a multi-parallel process with map reduce. It should be understood that FIG. 3 above generally describes the journal structure in a conventional replication configuration. In at least some embodiments described herein, however, the journal is divided into objects, and there is no undo log. Rather, there is a "do stream" of objects (i.e., the change objects 204) and a stream of metadata objects 206' that are ordered by time. Regarding the "do metadata stream" of FIG. 3, in some embodiments, to get to an older point in time, an older snapshot of the volume is used and system herein rolls forward from that older snapshot.

Referring again briefly to FIGS. 1A-1B, accessing an image at the replication site 122, 122' is generally performed using physical access or virtual access. In physical access (or logged access), a journal is rolled to the requested point in time by transferring data between the journal and the replica volume. In virtual access, a data structure is generated that designates whether a certain block is in the replicated volume or in the journal (and where in the journal it is). The data structure for a given point in time can be generated relatively quickly. However, in some embodiments, all data access (reads & writes) need to be routed through the data protection appliance in order to lookup the location in the data structure. This can provide fast access to the image but there can be slow performance in accessing the actual data. In at least some embodiments, as shown in the cloud replica site 122' of FIG. 1B, there are no DPA's 126 on the replica; rather, the volume (e.g., LUN 112' is rebuilt to the point in time using the map reduce technique described herein.

Generally, in accordance with at least some embodiments described herein, access to a PIT journal can be done by building a virtual image of the block device by using pointers to either the journal or the copy of the volume. Building the PIT can be done in a more efficient way, on demand, in at least some embodiments described herein, by doing rebuilds (e.g., updates) of a point in time journal using a multi-parallel process and also using map reduce.

For example, in accordance with at least some embodiments, the following technique can be used to rebuild/update a point in time journal: A list of meta data objects (e.g., metadata objects 206) is provided, along with the data that is needed to be applied to the disk data objects (e.g., disk object(s) 202)). For each offset that changes, write the latest update to the data (i.e., the disk object 202). Sort the metadata by address (and not by time like it is typically stored). For each address, get the latest metadata entries by time. Using multiple nodes (e.g., multiple processor or computers or virtual machines, e.g., the helper virtual machines described herein), each node reads some meta data objects and then maps them by address and reduces them by time (e.g., via the map/reduce procedure, as described further below). Determine which data needs to be applied to which locations in the disk. In parallel, read the disk portions (e.g. objects that needs update). For each such object (that needs update) read the data from the journal entries and apply it to the object. Because each disk chunk can be updated from a separate location, this process also can be highly parallel.

FIG. 4 is a first flowchart 300 illustrating, at a high level, a first method of updating/rebuilding point in time (PIT) information, using the data protection system of FIGS. 1A-3, in accordance with at least one illustrative embodiment of the instant disclosure. Referring to FIG. 4, the illustrative process for generating or rebuilding a PIT may be performed multiple times concurrently (e.g., in parallel) to rebuild multiple PITs, or can be performed using multiple nodes (e.g., multiple helper VM's), each mapper node receiving a portion of the metadata objects from the metadata stream (which is ordered by time). As further described herein, each mapper node/VM gets a portion of the meta data objects (portion size does not matter; may be predetermined to be a size smaller than that of the LUN itself) where the metadata object that are in the portion are ordered by date. The mapper node/VM then re-maps these metadata objects by offset (recall that each I/O metadata object can include information such as a volume identifier (ID), the I/O block offset within the volume, the I/O length, and a time stamp of the I/O).

The mapper node/VM then provides the metadata objects to a reducing node, where each reducer node is predetermined to be in charge of some portion of the offsets of the disk (e.g., the LU). The reducer node then reduces the metadata objects to keep only the latest metadata prior to the requested point in time, and this metadata is then used in a later step to read changes from a corresponding change object and then to apply the changes to a disk object and save a new copy of the disk object—where the new copy of the disk object describes the data of the respective portion of the disk (LUN) at the new time stamp. This is explained further herein.

The above-summarized process is able, to create a single PIT faster and more efficiently (as described more fully in connection with FIGS. 5 and 6) than in at least some conventional systems, because the mapping and reducing processes as described herein can all take place in parallel, at multiple nodes or virtual machines.

Referring now to FIG. 4, at block 402 of FIG. 4, the process of rebuilding a PIT begins. At block 404, the associated virtual machine (VM) (which, as described further herein, can be, in some embodiments, one of a plurality of parallel VMs/nodes) identifies one or more disk objects (e.g., disk objects 202 of FIG. 2A) that are associated with the respective PIT. For example, the VM may identify associated disk objects based upon a LUN associated with the PIT and the required restored PIT. At block 406, the associated VM identifies one or more metadata objects (e.g., metadata objects 206 of FIG. 2A) that are associated with the PIT. For example, the VM may identify associated metadata objects based upon the LUN associated with the PIT and the desired time associated with the PIT. At block 408, the associated VM identifies one or more change objects that are associated with the PIT. For example, the VM may identify associated change objects based upon the metadata objects identified at block 406 since the identified metadata objects may identify or otherwise reference any change objects associated with the PIT. In some embodiments, such as described in regard to FIG. 2D, change objects may be identified that include changes between a most recent full image of the LUN and a time associated with the PIT.

At block 410, the VM generates one or more new disk objects and, at block 412, it applies data changes (if applicable) to generate data for the PIT, which is stored in the new disk objects. In other words, at block 412, the VM modifies data of the disk objects identified at block 404 with data from the change objects identified at block 408, and stores the modified data in the new disk objects generated at block 410. At block 414, the new disk objects are copied to a volume that is associated with the VM. At block 416, process of creating/rebuilding the PIT completes.

More details about the process of FIG. 4 are provided in FIGS. 5A-5C and 6. FIG. 5A is a second flowchart 400 illustrating a second method of updating/rebuilding PIT information, using the data protection system of FIGS. 1A-3, in accordance with at least one illustrative embodiment of the instant disclosure. FIG. 5B is a simplified diagram illustrating a portion of the map/reduce process of FIG. 5A, in accordance with at least one illustrative embodiment. FIG. 5C is a simplified table illustrating a portion of the map/reduce process of FIG. 5B, in accordance with at least one illustrative embodiment. FIG. 6 is a third flowchart 500 illustrating the actions of block 320 of the second method of FIG. 5A in further detail, in accordance with at least one illustrative embodiment of the instant disclosure. Each of these is discussed further below.

Referring to FIGS. 5A-5C and 6, at block 305, the data recovery/rebuild PIT process 300 begins. For example, data recovery process 300 may be started manually by a user of data protection system 100. Alternatively, data protection system 100 may automatically perform data recovery process 300, for example when production site 102 has experienced a data loss or disaster, or to periodically identify image data for a given PIT. Advantageously, in at least some embodiments, the data recovery/rebuild PIT process 300 can be performed "on demand" from a user, a process, or in response to a one-time or periodic request from any type of entity, to help rebuild or recreate a desired PIT from one or more objects stored at replication site 122 (such as those in the object store 200 of FIG. 2A).

Referring again to FIG. 5A-5C and FIG. 6, as noted in block 310, in at least some embodiments, one or more additional nodes (e.g., "recovery helper VM's 104" as shown in FIG. 1A, 1B, 2C) can be provided or generated to assist with the multi-parallel generation of the PIT, such as by operably coupling one or more nodes 104" (FIG. 1A) to the data protection system 100 and/or by generating one or more recovery helper virtual machines (VMs) 104"(for example at replication site 122) or other processes capable of executing the blocks described herein. As described herein, replication site 122 may, in at least some embodiments be a cloud site 122', as shown in FIG. 1B. In particular, any one or more of the processes described for FIGS. 5A-5C and FIG. 6 (and also FIG. 4) can be performed, in at least some embodiments, substantially concurrently (i.e., at substantially the same time, in parallel), by a set of interconnected nodes (which can, for example, be processors, virtual machines, etc.) interconnected by one or more computer networks. In at least some embodiments, at least a portion of the set of interconnected nodes can be replaced by one or more distributed computer systems, and/or a single, large-scale multiprocessor configured to perform at least a portion of the processes described herein.

In some embodiments, the system of FIGS. 1A-2D generally does not have the multiple VM's 104" connected in parallel at times when it is not rebuilding a PIT; rather, at those times when there is no rebuilding, the system 100 has only object storage 200. When a PIT is to be rebuilt, multiple helper VM's 104" are assigned and operably coupled to the object storage 200 to help perform the work.

It will be appreciated that by using terms like "substantially concurrently" and "substantially at the same time" herein, it is not necessary or intended that each interconnected node begin or end its respective tasks exactly at the same time, as various network bandwidth factors, hardware differences, relative distances or proximity of the virtual machines and/or nodes, differences in associated objects at each offset or address, amount of I/O associated with each offset or address, etc., may mean that there may be slight lags or differences in the times that each interconnected node is able to complete its tasks (e.g., its MapReduce related tasks, as described further below). However, it is intended, when reference is made to terms like "substantially concurrently" or "in parallel" or "multi-parallel," that the interconnected virtual machines and/or nodes are all attempting to work in at approximately the same time and to receive their respective portions of information at approximately the same time.

A list of objects (e.g., metadata objects) associated with the LU or other device for which a PIT is being rebuilt, is retrieved or received (block 313), such as by accessing a stream of metadata objects. In at least some embodiments, the data objects can include a set of disk objects associated with data stored in a copy of a logical unit or virtual disk at a point in time of the production site, a set of change objects associated with one or more input/output (I/O) operations on the production site; and a set of metadata objects associated with the set of change objects. In some embodiments, the map/reduce processes described herein work only on the metadata, to create a list of the pieces of data that need to be copied from change objects 201 to data/disk objects 202 to help create a new point in time (PIT). In block 315 of FIG. 5A, this list of metadata objects (which will correspond to the inputs to the MapReduce Block 320) are divided into N portions that will each be provided to one or more of the helper VMs/nodes 104", in accordance with the MapReduce process (described more fully herein) (e.g., as illustrated in FIG. 2B-2D and FIGS. 5B-5C). The portions are divided into any size desired, generally a size that is small (e.g., a few MB or GB) compared to the size of the LUN. This is shown, for example, in the simplified diagram 450 of FIG. 5B, where the illustrative metadata stream 462 of metadata A through E, which is ordered by time (e.g., corresponding to metadata along time period 454) is broken up into three portions 458, each portion 458 assigned to a respective mapping node/VM 460. This simplified diagram is, of course, illustrative and not limiting.

Thus, in this example embodiment, a first portion 458 of the metadata stream 462, consisting of metadata A and B, is assigned to mapping node$_1$/VM$_1$ 460; the second portion, consisting of metadata C and D, is assigned to mapping node$_2$/VM$_2$ 460; and the third portion, consisting of metadata E and F, is assigned to mapping node node$_3$/VM$_3$ 460. Note also, per FIG. 5B, that each metadata A through E is associated with corresponding disk objects 456 during that time period, where the disk objects D1 through D4 correspond to simplified representations of the I/O associated with a given combination of volume identifier and I/O block offset within the volume, at a given time stamp. For example, the metadata A in the time period $T_0$ through $T_1$ is associated with disk objects D1, D2, D3, and D4, where, for example, the disk object D1 is associated with a particular volume ID and block offset, where, as shown in FIG. 5B, it has timestamps at the time period $T_0$-$T_1$, $T_1$-$T_2$, and $T_2$-$T_3$ (indicating that this disk object may have associated changes to it at those times, as pointed to by the metadata object). As noted elsewhere, the metadata object stream 462 can include other information, but in this simplified view the information that is particularly relevant to FIGS. 5A-6 is discussed.

Referring again to FIGS. 5A-5C and 6, each helper VM 104" (which in this part of the process serves as a mapping node/VM 460) gets the respective portion of the metadata stream 462 (block 315 of FIG. 5 and block 325 of FIG. 6), where the metadata stream 462 is ordered by time. Referring to FIG. 6, as described further below, the helper VM 104" (i.e., mapping node/VM 352) will take the chunk of time-ordered metadata 462 that it receives (block 325) and create a map to map this information based on offset (block 335 of FIG. 6), where the mapping node/VM 452 sends its map of its portion of received metadata 452 based on offset to a reducing node/VM that is assigned to that offset or range of offsets (block 335 of FIG. 6 and blocks 333A-333C of FIG. 5A).

For example, referring to FIGS. 5B and 5C, in this example, the map of FIG. 5C (e.g., the map referred to in 337A-337C of FIG. 5A) is created by each of the mapping nodes/VMs 452 of FIG. 5B. It can be seen that, in the metadata stream 462, disk object D1 is associated with metadata at several times along the timelines 454, and also is associated with the offset range of 0-500. For 0-500, D1 has metadata entries in three different time periods, disk object D3 has metadata entries in two different time periods, and so on In the table 470 of FIG. 5C, it can be seen that the first offset range 0-500, for D1, is assigned to a reducing node/VM named RVM_1. Similarly, the other offset ranges are each associated with a respective disk object and corresponding reducing VM, and have corresponding metadata entries, at different time stamps/time periods for that disk object. That is further illustrated in the arrows pointing to the blocks 345A-345C of FIG. 5A: in FIG. 5A it depicts, e.g., via the arrows going from block 337A to both blocks 345A and 345B, how a given I/O map (e.g., FIG. 5C) can provide metadata from its map associated with a first offset to a first reducing node/VM, metadata associated with a second offset to a second reducing node/VM, etc. It also should be understood that not all writes to a given offset or range of offsets are required to be overlapping. For example, there can be a write to an offset of size 50, and two writes to offset 200 size 10, where only the second two writes are overlapping. Similarly, for the portions of the disk reducing VM handles, these, too, may contain writes which are not overlapping or partially overlapping.

Referring still to FIGS. 5A-5C and 6, each reducer node/VM receiving the mapped information then read the data that the metadata describes (block 340 of FIG. 6) and reduces the data, where for each offset or address, only the latest metadata prior to the requested PIT is kept (block 343 of FIG. 6). The reducing node/VM receiving the metadata after the mapping then reduces the metadata so that for each offset there is only one entry. For example, referring to the example map of FIG. 5C, for disk object D2 (offset range 501-1000), there are three metadata entries by time: D2(T0-T1); D2(T1-T2); D2 (T2-T3). Referring to the timeline 454 of FIG. 5B, if the requested PIT was for time T3, then the reducing node/VM chooses to retain the latest data prior to that time T3, which in this example is the entry of D2 (T2-T3). If, for example, the desired PIT was for T2, then the data retained would be D2(T1-T2).

Each reducing VM 104" is in charge of a respective portion of the offsets of the volume/LUN 112 (see FIG. 2B) Once the reducer node/VM has completed block 343, the reducer node/VM 104" then reads the data relevant to changes from the change objects and reads the relevant disk data objects and applies the changes to them. (blocks 345 and 347 of FIG. 6; blocks 345A-345C of FIG. 5A)

Thus, as described above, the blocks in block 320 of FIG. 5A effectively implement a highly parallel process, using, in one embodiment, a map reduce process, such as Google MapReduce, to allow the one or more VMs or nodes of block 310 to more quickly and efficiently build on demand PIT information. In particular, the MapReduce Block 320 of FIG. 5A includes actions taken in blocks 325-350 of FIG. 6, as described above, where block 320 lists all the actions that can be taken, in parallel, in each respective one of the one or more mapper and reducer VMs/nodes of block 310. Thus, each of the respective other ones of the one or more mapper and reducer VMs/nodes also executes its own set of actions of blocks 325-350, at substantially the same time as all the other VMs/nodes, such that the respective mapper and reducer VMs/nodes are all performing blocks 325-355 in parallel, to effect a multi-parallel process. As noted above, these mapper and reducer VMs are spun or generated only as needed, such as to implement this map reduce process. As noted above, FIG. 6 lists the actions (blocks 325-345) taken by a single mapper and/or reducer VM/node, whereas FIG. 5A shows these same actions at a high level, also taking place in parallel at multiple VMs/nodes.

Referring to FIGS. 5A and 6, in at least some embodiments, it can be seen a first set of VMs/nodes (of a plurality of interconnected VMs/nodes), e.g., those nodes in block 320A, perform, in parallel, certain blocks of the process of block 320 (e.g., the mapper nodes/VMs), and a second, set of VMs/Nodes (e.g., those nodes in block 320C) (e.g., the reducer nodes/VMs) perform other blocks of the process of block 320, where in the illustration of FIG. 5A these are different nodes, but this is not limiting. In some embodiments, the VMs/Nodes performing the mapping function in block 320A are the same as the VMs/Nodes performing the reducing functions in block 320C. In some embodiments, the VMs/Nodes performing the mapping function in block 320A entirely different than the VMs/Nodes performing the reducing functions in block 320C. In addition, the number of VMs/nodes performing the mapping function need not be the same as the number of VMs/nodes performing the reducing function. Further, as FIG. 5A shows, one of the nodes (VM$_1$Node$_1$) performs actions in both block 320A and block 320C, but this is merely exemplary and not limiting.

Referring to block 320 of FIGS. 5 and 6, a respective VM/node 333A-333C thus receives a respective portion of metadata objects from a stream of metadata objects (block 325), such as a redo log metadata stream (where, in at least some embodiments, the redo log is the set of data and meta data objects), where the stream of metadata object is ordered by time. and the respective VM/node then maps each received portion of metadata based on offset, as described above, to a reducing node/VM that is assigned to that offset or range of offsets (block 335). Thus, each mapping VM gets a portion of the meta data objects (block 325), and the mapping VM then maps the metadata pieces in each object based on the offset to a reducing VM which is in charge of the offset (block 225). For example, if there are two reduce VMs, one can be in charge of offset 1-1000 and the other for offsets 1001-2000. The reducer node/VM reads the data that the metadata describes, which resides in change objects (block 340). The reducer node/VM then, for each offset/address, keeps only the latest metadata entry (latest by time) (block 343).

For each reducer node/VM that corresponds to a location where data has changed, the reducer VM/node then reads the data change object(s) that the meta data describes, which data resides in the change objects (block 345). For example, a given metadata can indicate, in some embodiments, that a change to volume Y happened at offset X at time t, and the data of the change is stored in some change object O. The next phase will read the changes from object O and read the disk object corresponding to offset X and apply the change to the disk object (block 347) and save a new copy of the disk object which describes the data of the portion of the disk at the new time stamp (block 350).

This can be done, in at least some embodiments, if it is known that certain VMs/nodes are designated to be responsible for certain types of data and if there is repetition or commonality or some other predetermined condition or relationship (which can be distinct or different predetermined conditions, for example) in some of the intermediate data that makes it appropriate to be routed to a particular VM/node, before being reduced. These I/O's can be combined into a second portion of data that is provided to certain VMs/nodes that are predetermined to be handling that type of I/O.

Referring again to FIGS. 5A-5C and 6, during the Reduce portion of the process (block 320*c*), for each offset/address, only the most recent I/O which is prior to the point in time being built is kept (block 345), and only the metadata associated with the most recent I/O before the point in time being built is kept. So, in some embodiments, each VM/Node that "handles" the I/O for those properties (e.g., in block 320C), only builds that portion of the PIT using the most recent I/O (which are before the requested point in time) relating to a given address/offset. Once it is known which data needs to be applied to given locations in the disk, the appropriate change objects associated with those dates can be received and applied in parallel (block 347) and a copy of the data object is saved (block 350). As noted above, all of this (blocks 320-350) is done substantially simultaneously, in parallel, at each VM/node.

When the MapReduce block 320 is completed, the results from all the VMs/Nodes are merged (block 355) and provided to help rebuild the PIT (block 365). At block 360, the VMs generated and/or nodes operably coupled at block 310 may be shut down and/or disconnected, for example, to reduce processor and memory consumption at replication site 122. At block 365, the process 300 completes.

In some described embodiments, hosts 104 and 116 of FIG. 1A may each correspond to one computer, a plurality of computers, or a network of distributed computers. For example, in some embodiments, host 104, and/or host 116 may be implemented as one or more computers such as shown in FIG. 7. As shown in FIG. 7, computer 800 may include processor 802, volatile memory 804 (e.g., RAM), non-volatile memory 806 (e.g., one or more hard disk drives (HDDs), one or more solid state drives (SSDs) such as a flash drive, one or more hybrid magnetic and solid state drives, and/or one or more virtual storage volumes, such as a cloud storage, or a combination of physical storage volumes and virtual storage volumes), graphical user interface (GUI) 808 (e.g., a touchscreen, a display, and so forth) and input/output (I/O) device 820 (e.g., a mouse, a keyboard, etc.). Non-volatile memory 806 stores computer instructions 812, an operating system 816 and data 818 such that, for example, the computer instructions 812 are executed by the processor 802 out of volatile memory 804 to perform at least a portion of the processes shown in FIGS. 4-6. Program code may be applied to data entered using an input device of GUI 808 or received from I/O device 820.

The processes of FIGS. 4-6 are not limited to use with the hardware and software of FIGS. 1A-3 or FIG. 8 and may find applicability in any computing or processing environment and with any type of machine or set of machines that may be capable of running a computer program. The processes described herein may be implemented in hardware, software, or a combination of the two. The logic for carrying out the method may be embodied as part of the system described in FIG. 7, which is useful for carrying out a method described with reference to embodiments shown in, for example, FIGS. 4-6. The processes described herein are not limited to the specific embodiments described. For example, the processes of FIGS. 4-6 are not limited to the specific processing order shown in FIGS. 4-6. Rather, any of the blocks of the processes may be re-ordered, combined, or removed, performed in parallel or in serial, as necessary, to achieve the results set forth herein.

Processor 802 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs). In some embodiments, the "processor" may be embodied in one or more microprocessors with associated program memory. In some embodiments, the "processor" may be embodied in one or more discrete electronic circuits. The "processor" may be analog, digital, or mixed-signal. In some embodiments, the "processor" may be one or more physical processors or one or more "virtual" (e.g., remotely located or "cloud") processors.

Various functions of circuit elements may also be implemented as processing blocks in a software program. Such software may be employed in, for example, one or more digital signal processors, microcontrollers, or general-purpose computers. Described embodiments may be implemented in hardware, a combination of hardware and software, software, or software in execution by one or more physical or virtual processors.

Some embodiments may be implemented in the form of methods and apparatuses for practicing those methods. Described embodiments may also be implemented in the form of program code, for example, stored in a storage medium, loaded into and/or executed by a machine, or transmitted over some transmission medium or carrier, such as over electrical wiring or cabling, through fiber optics, or via electromagnetic radiation. A non-transitory machine-readable medium may include but is not limited to tangible media, such as magnetic recording media including hard drives, floppy diskettes, and magnetic tape media, optical recording media including compact discs (CDs) and digital versatile discs (DVDs), solid state memory such as flash memory, hybrid magnetic and solid state memory, non-volatile memory, volatile memory, and so forth, but does not include a transitory signal per se. When embodied in a non-transitory machine-readable medium and the program code is loaded into and executed by a machine, such as a computer, the machine becomes an apparatus for practicing the method.

When implemented on one or more processing devices, the program code segments combine with the processor to provide a unique device that operates analogously to specific logic circuits. Such processing devices may include, for example, a general purpose microprocessor, a digital signal processor (DSP), a reduced instruction set computer (RISC), a complex instruction set computer (CISC), an application specific integrated circuit (ASIC), a field programmable gate array (FPGA), a programmable logic array (PLA), a microcontroller, an embedded controller, a multi-core processor, and/or others, including combinations of one or more of the above. Described embodiments may also be implemented in the form of a bitstream or other sequence of signal values electrically or optically transmitted through a medium, stored magnetic-field variations in a magnetic recording medium, etc., generated using a method and/or an apparatus as recited in the claims.

For example, when the program code is loaded into and executed by a machine, such as the computer of FIG. 7, the machine becomes an apparatus for practicing the invention. When implemented on one or more general-purpose processors, the program code combines with such a processor to provide a unique apparatus that operates analogously to specific logic circuits. As such a general-purpose digital machine can be transformed into a special purpose digital machine. FIG. 8 shows Program Logic 910 embodied on a computer-readable medium 930 as shown, and wherein the Logic is encoded in computer-executable code configured for carrying out the reservation service process of this invention and thereby forming a Computer Program Product 900. The logic may be the same logic on memory loaded on processor. The program logic may also be embodied in software modules, as modules, or as hardware modules. A processor may be a virtual processor or a physical processor. Logic may be distributed across several processors or virtual processors to execute the logic.

In some embodiments, a storage medium may be a physical or logical device. In some embodiments, a storage medium may consist of physical or logical devices. In some embodiments, a storage medium may be mapped across multiple physical and/or logical devices. In some embodiments, storage medium may exist in a virtualized environment. In some embodiments, a processor may be a virtual or physical embodiment. In some embodiments, a logic may be executed across one or more physical or virtual processors.

For purposes of illustrating the present embodiment, the disclosed embodiments are described as embodied in a specific configuration and using special logical arrangements, but one skilled in the art will appreciate that the device is not limited to the specific configuration but rather only by the claims included with this specification.

Various elements, which are described in the context of a single embodiment, may also be provided separately or in any suitable subcombination. It will be further understood that various changes in the details, materials, and arrangements of the parts that have been described and illustrated herein may be made by those skilled in the art without departing from the scope of the following claims.

We claim:

1. A storage system, comprising:
    a processor;
    a storage device in operable communication with the processor;
    a replication site in operable communication with the processor, the replication site configured to be in operable communication with a production site; and
    an object store configured for the replication site, the object store comprising a plurality of data objects associated with data stored in at least one logical unit (LU) of the production site, a plurality of metadata objects, and a plurality of change objects;
    wherein the replication site is configured to generate a requested point in time (PIT) based at least in part on the plurality of data objects, the generation of the PIT comprising:
        dividing a received stream comprising the plurality of metadata objects, ordered by time, into a plurality of respective portions of metadata objects, wherein each respective metadata object in the stream further comprises an I/O block offset in the LU, and wherein each of the plurality of respective portions of metadata objects are provided to a respective mapping node;
        remapping, at each respective mapper node, the received portion of metadata objects, such that the metadata objects in the received portion are ordered by their respective I/O block offsets;
        providing, based on the remapping, each respective metadata object, based on its respective I/O block offset within the LU, to a respective one of a plurality of reducer nodes in operable communication with the storage system, wherein the reducer node is assigned at least to the respective I/O block offset;
        performing a reduce operation on the received metadata objects, by each respective one of the plurality of reducer nodes, to retain, at the respective I/O block offset, only the most recent change to the metadata before the requested PIT, wherein the reduce operation further comprises reading data from the plurality of change objects based at least in part on the locations in the one or more LUs where change has occurred, wherein the data is read substantially concurrently and in parallel; and
        merging together the list of changes from each reducer node into the requested PIT;
    wherein the generation of the PIT further comprises performing at least one of the map and reduce operations substantially concurrently and in parallel, at each respective one of the respective map or reducer nodes.

2. The storage system of claim 1, wherein the generation of the requested PIT further comprises, substantially concurrently and in parallel:
    receiving at each respective reducer node, a list of the most recent changes that occurred at each I/O block offset before the desired PIT; and
    performing the reduce operation at each respective reducer node, to retain only the most recent change to the metadata before the requested PIT.

3. The storage system of claim 1, wherein the generation of the PIT further comprises, substantially concurrently and in parallel:
    applying changes from the change object to the plurality of data objects; and
    saving a new copy of the plurality of data objects as the PIT.

4. The storage system of claim 1, wherein at least a portion of at least one of the reducer and mapper nodes comprise virtual machines that are generated in response to receiving a request for a PIT.

5. The storage system of claim 1, wherein at least a portion of the reducer nodes are the same as at least a portion of the mapper nodes.

6. The storage system of claim 1, wherein at least a portion of the reducer nodes comprises nodes that are different than the first plurality of mapper nodes.

7. The storage system of claim 1, wherein, at each respective reducer node, the reduce operation comprises;
    ordering the metadata objects, associated with the respective offset, by time;
    retaining at the respective offset, based on the ordering by time, only the latest metadata objects prior to the requested PIT, so that for each respective offset, there is only one metadata entry;
    reading, from one or more of the plurality of change objects, associated data that the latest metadata object describes; and
    applying, to corresponding disk data objects, changes from the corresponding data change object relating to the most recent change that was retained.

8. A computer-implemented method, comprising:
    providing a process in operable communication with a storage device;
    generating an object store disposed at a replication site in operable communication with the processor, the object store comprising a plurality of data objects associated with data stored in at least one logical unit (LU) of a production site in operable communication with the replication site, a plurality of metadata objects, and a plurality of change objects;
    configuring the replication site to generate a requested point in time (PIT) based at least in part on the plurality of data objects, the generation of the PIT comprising:
        dividing a received stream comprising the plurality of metadata data objects, ordered by time, into a plurality of respective portions of metadata objects, wherein each respective metadata object in the stream further comprises an I/O block offset in the LU, and wherein each of the plurality of respective portions of metadata objects are provided to a respective mapping node;

remapping, at each respective mapper node, the received portion of metadata objects, such that the metadata objects in the received portion are ordered by their respective I/O block offsets;

providing, based on the remapping, each respective metadata object, based on its respective I/O block offset within the LU, to a respective one of a plurality of reducer nodes in operable communication with the storage system, wherein the reducer node is assigned at least to the respective I/O block offset;

performing a reduce operation on the received metadata objects, by each respective one of the plurality of reducer nodes, to retain, at the respective I/O block offset, only the most recent change to the metadata before the requested PIT, wherein the reduce operation further comprises reading data from the plurality of change objects based at least in part on the locations in the one or more LUs where change has occurred, wherein the data is read substantially concurrently and in parallel; and merging together the list of changes from each respective reducer node into the requested PIT wherein the generation of the PIT further comprises performing at least one of the map and reduce operations substantially concurrently and in parallel, at each respective one of the respective map or reducer nodes.

9. The computer-implemented method of claim 8, further comprising, substantially concurrently and in parallel:
receiving at each respective reducer node, a list of the most recent changes that occurred at each I/O block offset before the desired PIT; and
performing the reduce operation at each respective reducer node to retain only the most recent change to the metadata before the requested PIT.

10. The computer-implemented method of claim 8, further comprising, substantially concurrently and in parallel:
applying changes from the change object to the plurality of data objects; and
saving a new copy of the plurality of data objects as the PIT.

11. The computer-implemented method of claim 8, wherein at least a portion of at least one of the reducer and mapper nodes comprise virtual machines that are generated in response to receiving a request for a PIT.

12. The computer-implemented method of claim 8, wherein at least a portion of the reducer nodes are the same as at least a portion of the mapper nodes.

13. The computer-implemented method of claim 8, wherein, at each respective reducer node, the reduce operation comprises;
ordering the metadata objects, associated with the respective offset, by time;
retaining at the respective offset, based on the ordering by time, only the latest metadata objects prior to the requested PIT, so that for each respective offset, there is only one metadata entry;
reading, from one or more of the plurality of change objects, associated data that the latest metadata object describes; and
applying, to corresponding disk data objects, changes from the corresponding data change object relating to the most recent change that was retained.

14. A computer program product including a non-transitory computer readable storage medium having computer program code encoded thereon that when executed on a processor of a computer causes the computer to operate a storage system, the computer program product comprising:
computer program code for providing a processor;
computer program code for providing a storage device in operable communication with the processor;
computer program code for generating an object store disposed at a replication site in operable communication with the processor, the object store comprising a plurality of data objects associated with data stored in at least one logical unit (LU) of a production site in operable communication with the replication site, a plurality of metadata objects, and a plurality of change objects;
computer program code for configuring the replication site to generate a requested point in time (PIT) based at least in part on the plurality of data objects;
computer program code for dividing a received stream comprising the plurality of metadata data objects, ordered by time, into a plurality of respective portions of data objects, wherein each respective metadata object in the stream further comprises an I/O block offset in the LU, and wherein each of the plurality of respective portions of metadata objects are provided to a respective mapping node;
computer program code for remapping, at each respective mapper node, the received portion of metadata objects, such that the metadata objects in the received portion are ordered by their respective I/O block offsets;
computer program code for providing, based on the remapping, each respective metadata object, based on its respective I/O block offset within the LU, to a respective one of a plurality of reducer nodes in operable communication with the storage system, wherein the reducer node is assigned at least to the respective I/O block offset;
computer program code for performing a reduce operation on the received metadata objects, by each respective one of the plurality of reducer nodes, to retain, at the respective I/O block offset, only the most recent change to the metadata before the requested PIT, wherein the reduce operation further comprises reading data from the plurality of change objects based at least in part on the locations in the one or more LUs where change has occurred, wherein the data is read substantially concurrently and in parallel;
computer program code for merging together the list of changes from each respective reducer node into the requested PIT; and
computer program code for performing at least one of the map and reduce operations substantially concurrently and in parallel, at each respective one of the respective map or reducer nodes.

15. The computer program product of claim 14, further comprising:
computer program code for receiving at each respective reducer node, substantially concurrently and in parallel, a list of the most recent changes that occurred at each offset before the desired PIT;
computer program code for performing a reduce operation at each respective reducer node, substantially concurrently and in parallel, to retain only the most recent change to the metadata before the requested PIT;

computer program code for applying changes from the change object to the plurality of data objects, substantially concurrently and in parallel; and computer program code for saving, substantially concurrently and on parallel, a new copy of the plurality of data objects as the PIT.

16. The computer program product of claim 14, wherein, at each respective reducer node, the reduce operation comprises;

computer program code for ordering the metadata objects, associated with the respective offset, by time;

computer program code for retaining at the respective offset, based on the ordering by time, only the latest metadata objects prior to the requested PIT, so that for each respective offset, there is only one metadata entry;

computer program code for reading, from one or more of the plurality of change objects, associated data that the latest metadata object describes; and computer program code for applying, to corresponding disk data objects, changes from the corresponding data change object relating to the most recent change that was retained.

\* \* \* \* \*